US011184178B2

(12) United States Patent
Russell et al.

(10) Patent No.: US 11,184,178 B2
(45) Date of Patent: Nov. 23, 2021

(54) METHOD AND SYSTEM FOR INTELLIGENT TRANSPORTATION SYSTEM CERTIFICATE REVOCATION LIST REDUCTION

(71) Applicant: BlackBerry Limited, Waterloo (CA)

(72) Inventors: Nicholas James Russell, Newbury (GB); Jonathon Brookfield, Maidenhead (GB); Stephen John Barrett, Haywards Heath (GB)

(73) Assignee: BlackBerry Limited, Waterloo (CA)

( * ) Notice: Subject to any disclaimer, the term of this patent is extended or adjusted under 35 U.S.C. 154(b) by 228 days.

(21) Appl. No.: 16/145,834

(22) Filed: Sep. 28, 2018

(65) Prior Publication Data

US 2020/0106624 A1    Apr. 2, 2020

(51) Int. Cl.
| | |
|---|---|
| *H04L 29/06* | (2006.01) |
| *H04L 9/32* | (2006.01) |
| *H04L 29/08* | (2006.01) |
| *H04W 4/40* | (2018.01) |
| *H04L 29/12* | (2006.01) |

(52) U.S. Cl.
CPC ............ *H04L 9/3268* (2013.01); *H04L 9/321* (2013.01); *H04L 63/0823* (2013.01); *H04L 63/107* (2013.01); *H04L 63/108* (2013.01); *H04L 67/12* (2013.01); *H04L 67/18* (2013.01); *H04W 4/40* (2018.02); *H04L 61/6054* (2013.01); *H04L 65/1006* (2013.01)

(58) Field of Classification Search
CPC ... H04L 9/3268; H04L 9/321; H04L 63/0823; H04L 63/107; H04L 63/108; H04L 67/12; H04L 67/18; H04L 61/6054; H04L 65/1006; H04W 4/40

USPC ........................................................ 713/158
See application file for complete search history.

(56) References Cited

U.S. PATENT DOCUMENTS

| | | |
|---|---|---|
| 8,090,949 B2 | 1/2012 | Bellur et al. |
| 9,742,569 B2 | 8/2017 | van Roermund |

(Continued)

FOREIGN PATENT DOCUMENTS

| | | |
|---|---|---|
| DE | 102015210275 A1 | 12/2016 |
| WO | 2018150546 A1 | 8/2018 |

OTHER PUBLICATIONS

Raya et al. Securing Vehicular Communications, Nov. 30, 2006, IEEE, vol. 13, issue 5, pp. 8-15. (Year: 2006).*

(Continued)

*Primary Examiner* — Luu T Pham
*Assistant Examiner* — Jenise E Jackson
(74) *Attorney, Agent, or Firm* — Moffat & Co

(57) ABSTRACT

A method at a computing device within an Intelligent Transportation System (ITS), the method including: receiving a first message, the first message including at least tailoring information for a first ITS endpoint and intended journey details for the first ITS endpoint; storing all or a subset of data from the first message; obtaining a full certificate revocation list; creating a tailored certificate revocation list based on data in the first message and the full certificate revocation list, the tailored certificate revocation list containing certificates or identifiers of certificates for ITS endpoints that may be encountered by the first ITS endpoint when navigating a route provided in the intended journey details; and providing the tailored certificate revocation list to the first ITS endpoint.

21 Claims, 13 Drawing Sheets

(56) References Cited

U.S. PATENT DOCUMENTS

| | | | |
|---|---|---|---|
| 2009/0235071 A1* | 9/2009 | Bellur | H04L 9/3268 |
| | | | 713/158 |
| 2009/0260057 A1* | 10/2009 | Laberteaux | H04L 63/0823 |
| | | | 726/2 |
| 2011/0191581 A1* | 8/2011 | Shim | H04L 67/12 |
| | | | 713/158 |
| 2015/0222632 A1* | 8/2015 | Ichijo | G06F 21/44 |
| | | | 726/7 |
| 2017/0222990 A1* | 8/2017 | Romansky | H04L 9/14 |

OTHER PUBLICATIONS

Zhang et al, An Efficient Certificate Revocation Validation Scheme with K-means Clustering for Vehicular Ad Hoc Networks, Jul. 4, 2012, IEEE, pp. 1-6. (Year: 2012).*

Patent Cooperation Treaty, Written Opinion of the International Searching Authority for International application No. PCT/CA2019/051285 dated Nov. 14, 2019 (6 pages).

Tuladhar et al., "Efficient and Scalable Certificate Revocation List Distribution in Hierarchical Vanets" 2018 IEEE International Conference on Electro/Information Techology (EIT), May 3, 2018, [online], retrieved on Dec. 23, 2019 from: https://ieeexplore.ieee.org/document/8500150?arnumber=8500150&SID=EBSCO:edseee.

Patent Cooperation Treaty, International Search Report for International application No. PCT/CA2019/051285 dated Nov. 14, 2019 (4 pages).

Khodaei et al., "Efficient, Scalable, and Resilient Vehicle-Centric Certificate Revocation List Distribution in VANETs," WiSec '18, Proceedings of the 11th ACM Conference on Security and Privacy in Wireless and Mobile Networks (WiSec), Stockholm, Sweden, pp. 172-183, Jun. 18, 2018 [online], retrieved from arxiv.org/abs/1807.02706?.

IEEE Standards Association, IEEE Standard; IEEE 802.11-2016: "IEEE Standard for Information technology—Telecommunications and information exchange between systems Local and metropolitan area networks—Specific requirements—Part 11: Wireless LAN Medium Access Control (MAC) and Physical Layer (PHY) Specifications", published Dec. 14, 2016.

3rd Generation Partnership Project, 3GPP Standard; 3GPP TS 23.401: "General Packet Radio Service (GPRS) enhancements for Evolved Universal Terrestrial Radio Access Network (E-UTRAN) access", Version 16.0.0, Sep. 17, 2018.

3rd Generation Partnership Project, 3GPP Standard; 3GPP TS 23.501: "Sustem Architecture for the 5G System", Version 15.3.0, Sep. 17, 2018.

3rd Generation Partnership Project, 3GPP Standard; 3GPP TS 23.285: "Architecture enhancements for V2X services", Version 15.1.0, Jun. 19, 2018.

IEEE Standards Association, IEEE Standard; IEEE 1609.2-2016: "IEEE Standard for Wireless Access in Vehicular Environments—Security Services for Applications and Management Messages", published Mar. 1, 2016.

Camp LLC—Vehicle Safety Communications 5 Consortium, "Security Credential Management System Proof-of-Concept Implementation: EE Requirements and Specifications Supporting SCMS Software Release 1.1", May 4, 2016.

Camp LLC—Vehicle Safety Communications 5 Consortium, "Security Credential Management System Proof-of-Concept Implementation: EE Requirements and Specifications Supporting SCMS Software Release 1.2.2", Nov. 15, 2016.

International Telecommunication Union, ITU-T X.509: "Information technology—Open Systems Interconnection—The Directory: Public-key and attribute certificate frameworks", Oct. 2016.

IEEE Standards Association, IEEE Standard; IEEE 802.11p-2010: "IEEE Standard for Information technology—Local and metropolitan area networks—Specific requirements—Part 11: Wireless LAN Medium Access Control (MAC) and Physical Layer (PHY) Specifications—Amendment 6: Wireless Access in Vehicular Environments", published Jul. 15, 2010.

European Telecommunications Standards Institute, European Standard; ETSI TS 102 941: "Intelligent Transport Systems (ITS); Security; Trust and Privacy Management", No. V1.2.1, May 2018.

Internet Engineering Task Force, Request for Comments; IETF RFC 6960: "X.509 Internet Public Key Infrastructure Online Certificate Status Protocol—OCSP", Jun. 2013.

Internet Engineering Task Force, Request for Comments; IETF RFC 6066: "Transport Layer Security (TLS) Extensions: Extension Definitions", Jan. 2011.

Internet Engineering Task Force, Request for Comments; IETF RFC 6961: "The Transport Layer Security (TLS) Multiple Certificate Status Request Extension", Jun. 2013.

European Telecommunications Standards Institute, European Standard; ETSI EN 302 637-2: "Intelligent Transport Systems (ITS); Vehicular Communications; Basic Set of Applications; Part 2: Specification of Cooperative Awareness Basic Service", No. V1.3.2, Nov. 2011.

European Telecommunications Standards Institute, European Standard; ETSI EN 302 637-3: "Intelligent Transport Systems (ITS); Vehicular Communications; Basic Set of Applications; Part 3: Specifications of Decentralized Environmental Notification Basic Service", No. V1.2.2, Nov. 2011.

IEEE Standards Association, IEEE Standard; IEEE 1609.3-2016: "IEEE Standard for Wireless Access in Vehicular Environments (WAVE)—Networking Services", published Apr. 29, 2016.

European Telecommunications Standards Institute, European Standard; ETSI EN 302 665: "Intelligent Transport Systems (ITS); Communications Architecture", No. V1.1.1, Sep. 2010.

* cited by examiner

METHOD AND SYSTEM FOR INTELLIGENT TRANSPORTATION SYSTEM CERTIFICATE REVOCATION LIST REDUCTION

FIELD OF THE DISCLOSURE

The present disclosure relates to Intelligent Transportation Systems (ITS), and in particular relates to certificate revocation lists in intelligent transportation systems.

BACKGROUND

Certificate revocation lists (CRLs) are currently used in intelligent transportation systems to check revocation status of certificates received in ITS messages, and thus determine if a received message can be trusted. In other words, the check determines that the message is not from a known, misbehaving ITS endpoint.

However, the use of CRLs for this purpose may be problematic in several ways. Typically, a CRL may cover a very large geographic area, and thus the size of the CRL may be large. It is not yet clear who will provide certificate authorities, including root certificate authorities, however it may be one of a combination of ITS endpoint Original Equipment Manufacturers (OEMs), regional regulatory authorities, third parties on behalf of ITS endpoint OEMs, regional road operators, among others. As each of these may need its own CRL, this may result in many CRLs needing to be provisioned in an ITS endpoint, where each CRL could be very large. Further, if regional regulatory authorities, regional road operators and/or third parties on behalf of regional regulatory authorities or regional road operators provide CRLs, then since the ITS endpoints can be mobile across different regions such as country borders, multiple CRLs may be needed in ITS endpoints. For example, one or more CRLs may be needed for each region traversed.

The size of the CRL could also be very large if, for example, many ITS endpoints have been determined to be misbehaving and thus have had their certificates revoked. For example, a system of 270 million vehicles in the United States may create very large CRLs, even if just 1% of those vehicles are determined to be misbehaving and thus have had their certificates revoked. In this case, the CRL for such system would have 2.7 million entries. Furthermore, other types of endpoints, including roadside units (RSUs), could also have their certificates revoked, and may also need to be included on a CRL.

In this regard, it may be an onerous task for an ITS endpoint to check its CRLs both in terms of both processing and memory. The storage locally of the large CRL may require very large memories to be added to the ITS endpoint. Further, the processing of a message may be time-consuming. For example, in an urban environment, an ITS endpoint may be receiving around 1000 signed messages every second, based on 100 ITS endpoints in proximity to one another, where each is sending 10 messages in a second.

Further, checking CRL(s) may be onerous in terms of data connection resources to provision multiple large CRLs to all ITS endpoints in an ITS. In particular, data connections would need to transport a large amount of data to a large number of recipients, which could be costly on resources such as bandwidth, radio access, contention ratios, among other factors. Also, the endpoint would need to access the data connection for as long as the CRL takes to download, which could be a long time due to factors such as a large number of CRLs to be downloaded, the CRL size to be downloaded, available bandwidth of the data connection used to transport the CRLs, available data connection coverage to the ITS endpoint, among other factors.

BRIEF DESCRIPTION OF THE DRAWINGS

The present disclosure will be better understood with reference to the drawings, in which.

DETAILED DESCRIPTION OF THE DRAWINGS

Figure 1:
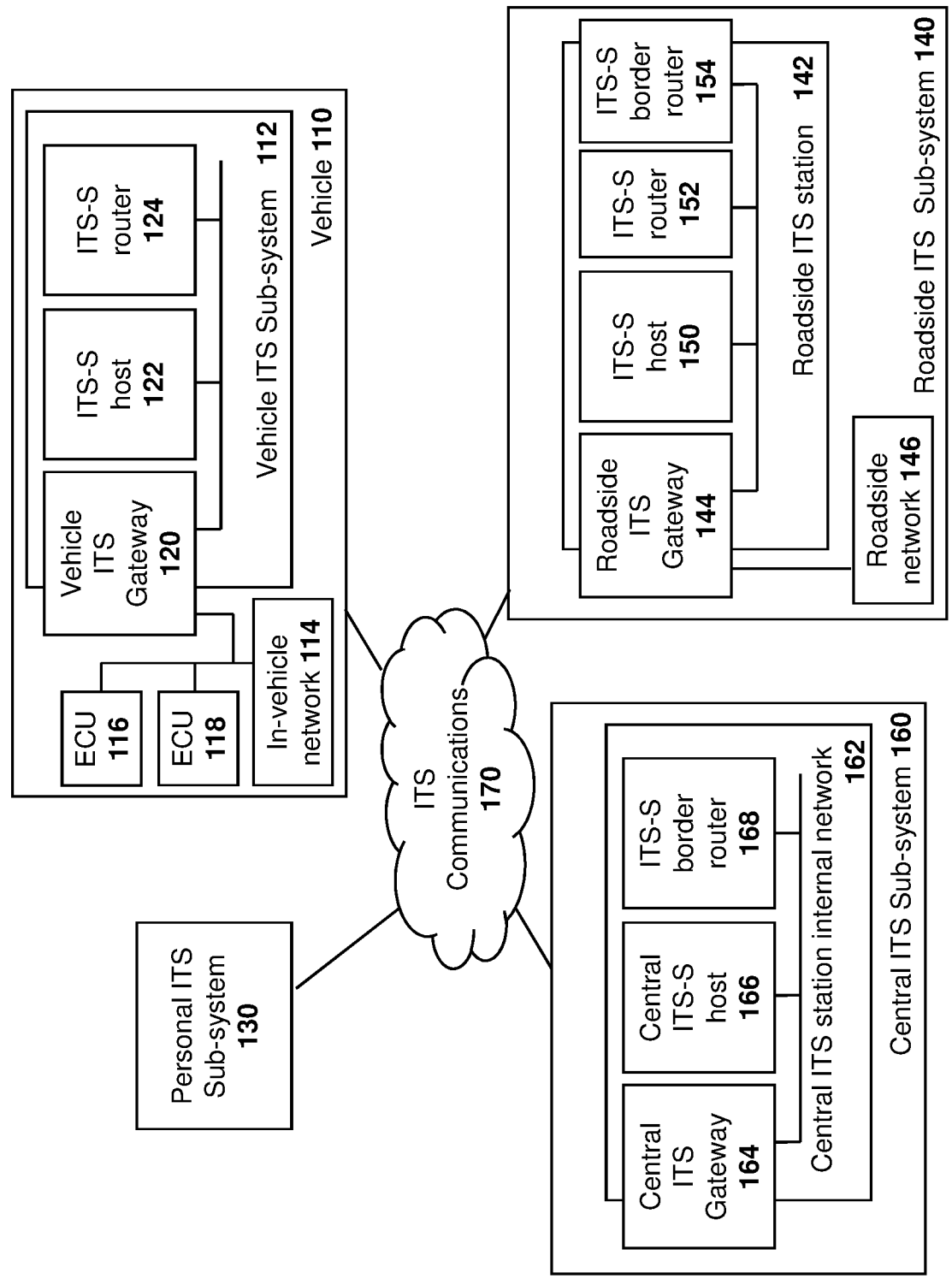
FIG. 1 is block diagram of an intelligent transportation system.

The present disclosure provides a method at a computing device within an Intelligent Transportation System (ITS), the method comprising: receiving a first message, the first message including at least tailoring information for a first ITS endpoint and intended journey details for the first ITS endpoint; storing all or a subset of data from the first message; obtaining a full certificate revocation list; creating a tailored certificate revocation list based on data in the first message and the full certificate revocation list, the tailored certificate revocation list containing certificates or identifiers of certificates for ITS endpoints that may be encountered by the first ITS endpoint when navigating a route provided in the intended journey details; and providing the tailored certificate revocation list to the first ITS endpoint.

The present disclosure further provides a computing device within an Intelligent Transportation System (ITS), the computing device comprising: a processor; and a communications subsystem, wherein the computing device is configured to: receive a first message, the first message including at least tailoring information for a first ITS endpoint and intended journey details for the first ITS endpoint; store all or a subset of data from the first message; obtain a full certificate revocation list; create a tailored certificate revocation list based on data in the first message and the full certificate revocation list, the tailored certificate revocation list containing certificates or identifiers of certificates for ITS endpoints that may be encountered by the first ITS endpoint when navigating a route provided in the intended journey details; and provide the tailored certificate revocation list to the first ITS endpoint.

The present disclosure further provides a computer readable medium for storing instruction code, which, when executed by a processor of a computing device within an Intelligent Transportation System (ITS) cause the computing device to: receive a first message, the first message including at least tailoring information for a first ITS endpoint and intended journey details for the first ITS endpoint; store all or a subset of data from the first message; obtain a full certificate revocation list; create a tailored certificate revocation list based on data in the first message and the full certificate revocation list, the tailored certificate revocation list containing certificates or identifiers of certificates for ITS endpoints that may be encountered by the first ITS endpoint when navigating a route provided in the intended journey details; and provide the tailored certificate revocation list to the first ITS endpoint.

In the embodiments described below, the following terminology may have the following meaning, as provided in Table 1.

TABLE 1

| Terminology | |
| --- | --- |
| Term | Brief Description |
| CRL Provisioning Server | A functional entity that provides vehicle to anything (V2X) endpoints with one or more CRLs, and which may be associated with or known as a Certificate Revocation Authorizing Certificate Authority (CRACA). May also be known as a CRL Store, (CRL) Distribution Center, etc. May be an RSU. |
| CRL Provisioning Proxy | A functional entity that proxies messages between ITS endpoints and CRL Provisioning Servers and that may add additional data/information to the messages that it proxies. May be collocated with the CRL Provisioning Server. May be an RSU. |
| Data Connection | A connection that provides transport of data (e.g. IP datagrams) between two entities (e.g. ITS endpoint, CRL Provisioning Proxy, CRL Provisioning Server, etc.). May utilize a radio access network (e.g. cellular, IEEE 802.11p, wireless power access, satellite, etc) or a wired access network (e.g. Ethernet, Digital Subscriber Line (DSL), cable, power-line data, etc). |
| Full CRL | A CRL obtained from a CRL Provisioning Server, which may be the same or a superset of the Tailored CRL. |
| Intended Journey Details | A collection of one or more pieces of Location Information, that describe a journey/intended journey of an ITS endpoint. This collection may consist of one or more of the following: Location Information One or more Time Stamps e.g. for when the ITS endpoint is expected to be at a certain location, for when the ITS endpoint is expected to no longer be at a certain location, etc. Bearing/heading e.g. degrees from north Speed/velocity information Etc. |
| "Location Information" or "Location" | One or more of a Global Navigation Satellite System (GNSS) co-ordinate, radius from a certain GNSS co-ordinate, Cell ID, Location Area ID, Routing Area ID, Tracking Area ID, Public Land Mobile Network (PLMN) ID, waypoint, postal address, etc. |
| User Equipment (UE) | A device consisting of a Universal Integrated Circuit Card (UICC) and a Mobile Entity (ME). The UICC may contain a Subscriber Identity Module (SIM) and/or a Universal SIM (USIM). |
| ITS endpoint | An entity that can send and/or receive V2X related messaging e.g. vehicle, roadside unit (RSU), UE, etc. One implementation maybe an application residing on a communications module that communicates with an ME using AT commands. |
| Other Server | May be a CRL Provisioning Server (see above), a CRL Provisioning Proxy, etc |

Intelligent Transportation System (ITS) software and communication systems are designed to, for example, enhance road safety and road traffic efficiency. Such systems include vehicle to/from vehicle (V2V) communications, vehicle to/from infrastructure (V2I) communications, vehicle to/from network (V2N) communications, vehicle to/from the pedestrian or portable (V2P) communications, and vehicle to network to vehicle (V2N2V). The communications from a vehicle to/from any of the above may be generally referred to as V2X.

Further, other elements in a system may communicate with each other. Thus, systems may include portable to/from infrastructure (P2I) communications, infrastructure to infrastructure (I2I) communications, portable to portable (P2P) communications (also known as peer to peer communications), among others. As used herein, V2X thus includes any communication between an ITS station and another ITS station, where the station may be associated with a vehicle, road side unit, network element, pedestrian, cyclist, animal, among other options. For example, vehicles on a highway may communicate with each other, allowing a first vehicle to send a message to one or more other vehicles to indicate that it is braking, thereby allowing vehicles to follow each other more closely.

Communications between elements of an ITS may further allow for potential collision detection and allow a vehicle with such a device to take action to avoid a collision, such as braking or swerving. For example, an active safety system on a vehicle may take input from sensors such as cameras, RADAR, LIDAR, and V2X, and may act on them by steering or braking, overriding or augmenting the actions of the human driver or facilitating autonomous driving where a human is not involved at all. Another type of advanced driver assistance system (ADAS) is a passive safety system that provides warning signals to a human driver to take actions. Both active and passive safety ADAS systems may take input from V2X and ITS systems.

In other cases, fixed infrastructure may give an alert to approaching vehicles that they are about to enter a dangerous intersection or alert vehicles to other vehicles or pedestrians approaching the intersection. This alert can include the state of signals at the intersection (signal phase and timing (SPaT)) as well as position of vehicles or pedestrians or hazards in the intersection. Other examples of ITS communications would be known to those skilled in the art.

Reference is now made to FIG. 1, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 1, a vehicle 110 includes a vehicle ITS subsystem 112. Vehicle ITS sub-system 112 may, in some cases, communicate with an in-vehicle network 114. The in-vehicle network 114 may receive inputs from various electronic control unit (ECUs) 116 or 118 in the environment of FIG. 1.

Vehicle ITS sub-system 112 may include a vehicle ITS gateway 120 which provides functionality to connect to the in-vehicle network 114.

Vehicle ITS sub-system 112 may further have an ITS-S host 122 which contains ITS applications and functionality needed for such ITS applications.

Further, an ITS-S router 124 provides the functionality to interconnect different ITS protocol stacks, for example at layer 3. ITS-S router 124 may be capable of converting protocols, for example for the ITS-S host 122.

Further, the ITS system of FIG. 1 may include a personal ITS sub-system 130, which may provide application and communication functionalities of ITS communications (ITSC) in handheld or portable devices, such as personal digital assistants (PDAs), mobile phones, user equipment, among other such devices.

A further component of the ITS system shown in the example of FIG. 1 includes a roadside ITS sub-system 140, which may contain roadside ITS stations which may be deployed on bridges, traffic lights, among other options.

The roadside ITS sub-system 140 includes a roadside ITS station 142 which includes a roadside ITS gateway 144. Such gateway may connect the roadside ITS station 142 with one or more roadside networks 146.

A roadside ITS station 142 may further include an ITS-S host 150 which may contain ITS-S applications and the functionalities needed for such applications.

The roadside ITS station 142 may further include an ITS-S router 152, which provides the interconnection of different ITS protocol stacks, for example at layer 3.

The roadside ITS station 142 may further include an ITS-S border router 154, which may provide for one or both of the interconnection of two protocol stacks and the interconnection to an external network.

A further component of the ITS system in the example of FIG. 1 includes a central ITS sub-system 160 which includes a central ITS station internal network 162.

Central ITS station internal network 162 includes a central ITS gateway 164, a central ITS-S host 166 and a ITS-S border router 168. Central ITS gateway 164, central ITS-S host 166 and ITS-S border router 168 have similar functionality to the Roadside ITS gateway 144, ITS-S host 150 and ITS-S border router 154 of the roadside ITS station 142.

Communications between the various components may occur through an ITS peer-to-peer communications network or via network infrastructure 170.

From FIG. 1 above, V2X communications may be used for both road safety and for improving efficiency of road transportation, including movement of vehicles, reduced fuel consumption, among other factors.

V2X messages are defined by the European Telecommunications Standards Institute (ETSI) fall into two categories, namely Cooperative Awareness Message (CAM) and Decentralized Environmental Notification Message (DENM). A CAM message is a periodic, time triggered message that may provide status information to neighboring ITS stations. The broadcast is typically over a single hop and the status information may include a station type, position, speed, heading, among other options. Optional fields in a CAM message may include information to indicate whether the ITS station is associated with roadworks, rescue vehicles, or a vehicle transporting dangerous goods, among other such information.

Typically, a CAM message is transmitted between 1 and 10 times per second.

A DENM message is an event triggered message that is sent only when a trigger condition is met. For example, such trigger may be a road hazard or an abnormal traffic condition. A DENM message is broadcast to an assigned relevance area via geo-networking. It may be transported over several wireless hops and event information may include details about the causing event, detection time, event position, event speed, heading, among other factors. DENM messages may be sent, for example, up to 20 times per second over a duration of several seconds.

Similar concepts apply to the Dedicated Short Range Communications (DSRC)/Wireless Access In Vehicular Environments (WAVE) system in which a Basic Safety Message (BSM) is specified instead of the CAM/DENM messaging from ETSI.

Cellular V2X

Various systems or architectures can provide V2X communication. Cellular networks, such as those defined in the Third Generation Partnership Project (3GPP) set of specifications are one of them. As defined above, another alternative is DSRC/WAVE which makes use of the Institute of Electrical and Electronics Engineers (IEEE) 802.11 radio technology. Thus, while the present disclosure is described with regards to cellular V2X communication, V2X messages may equally be sent through networks which are not 3GPP cellular networks. In particular, V2X communication may in one case proceed via the infrastructure using 802.11 technology Using the cellular example, various options are possible. These include unicast uplink and/or downlink via the infrastructure. A further option includes broadcast downlink transmission via the infrastructure. A further option includes side link broadcast by a device.

The various transmission modes may be combined. For example, a side link (PC5) or Uu unicast uplink transmission might be used to get a V2X message from a vehicle to a cellular infrastructure and then to a network element such as a V2X application server. Any of a Multimedia Broadcast Multicast Service (MBMS) broadcast, ProSe broadcast, or Uu unicast might then be used to get a V2X message from the V2X application server via the cellular infrastructure to ITS stations.

Figure 2:
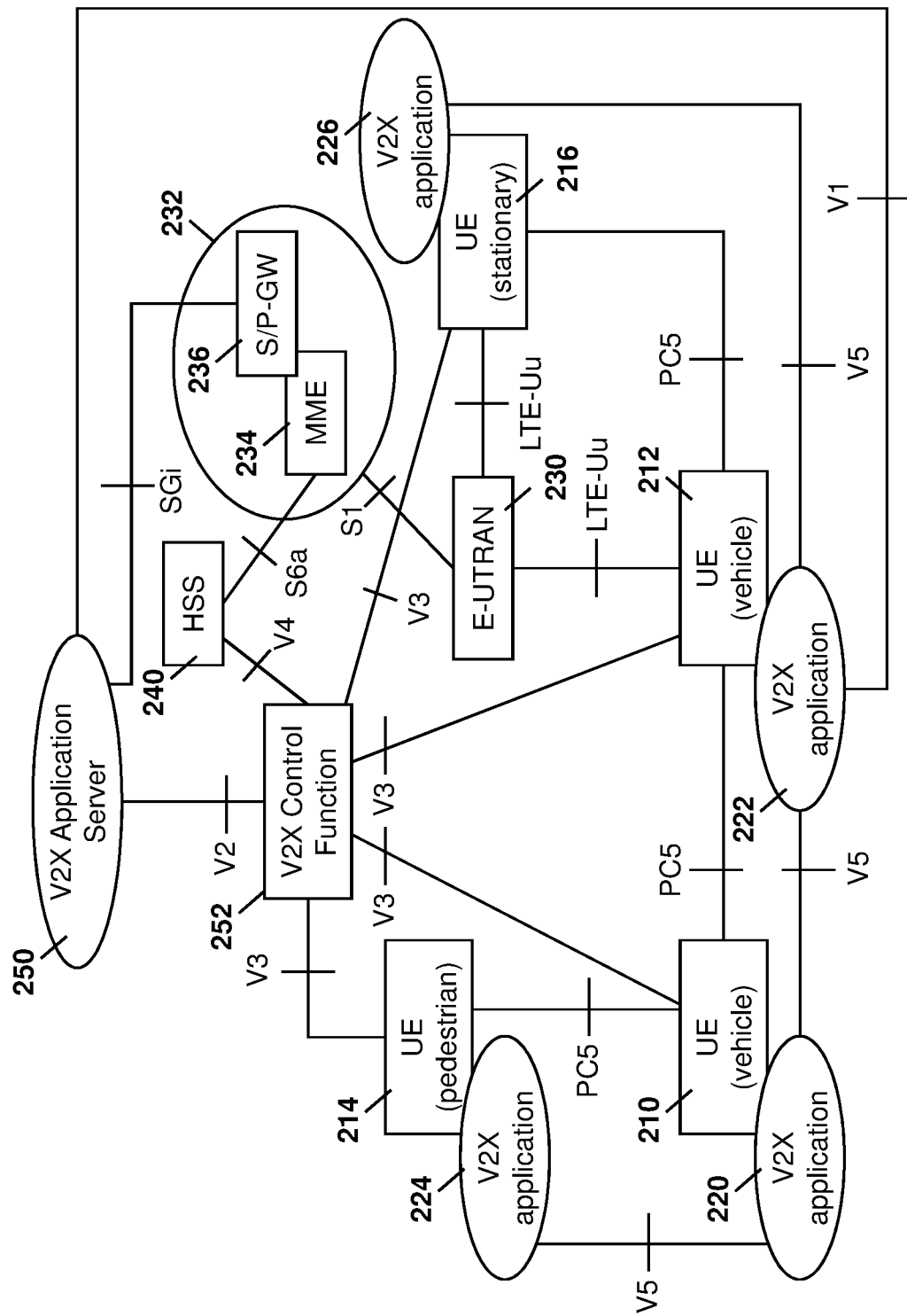
FIG. 2 is a block diagram showing an architecture for cellular based Vehicle to anything (V2X) communication.

For example, reference is now made to FIG. 2, which shows an example 3GPP system architecture that may be used for uplink and downlink communications for both the case of a Uu unicast, as well as for a PC5 transmission, as for example defined in the Third Generation Partnership Project (3GPP) Technical Specification (TS) 23.285, "Architecture enhancements for V2X services".

In the embodiment of FIG. 2, each of a plurality of ITS stations is defined as a user equipment (UE). These UEs are shown, for example, as UE 210 which may represent a vehicle ITS station, UE 212 which may represent another vehicle ITS station, UE 214 which may represent a pedestrian ITS station and UE 216 which may represent a stationary road side unit ITS station.

Each ITS station has an associated V2X application. Therefore, UE 210 has a V2X application 220, UE 212 has a V2X application 222, UE 214 has a V2X application 224, and UE 216 has a V2X application 226.

Each of the UEs may communicate with each other, for example, through a PC5 broadcast interface.

Further, the V2X applications may communicate between each other using a V5 reference point.

The cellular system may include, for example, an evolved-Universal Terrestrial Radio Access (E-UTRAN) 230, which may provide one or more base stations connected to an evolved packet core (EPC) 232.

The evolved packet core 232 may include a Mobility Management Entity (MME) 234 and a Service/Packet Gateway (S/P-GW) 236.

Communications between the UEs and the E-UTRAN may occur over an LTE-Uu unicast cellular communication channel. Further, the E-UTRAN 230 may communicate with the EPC 232 via an S1 interface.

The EPC 232, and in particular MME 234, communicates with a Home Subscriber Server (HSS) 240 via an S6a interface. Further, the S/P-GW 236 may communicate with a V2X application server 250 utilizing an SGi interface.

The V2X application server 250 is a network entity on the application layer that is accessible via the 3GPP network which provides for various services including receiving uplink data from a UE over unicast or PC5, delivering data to UEs in a target area using unicast delivery and/or PC5 and/or an MBMS delivery, mapping from geographic location information to appropriate target areas over which MBMS transmissions will be made, and providing the MBMS system with the information needed in order to ensure that the MBMS message can be formatted and transmitted over the appropriate area.

The V2X applications 220, 222, 224 and 226 communicate with the V2X application server. The V2X control function is used to provision the UE with necessary parameters in order to use V2X communication.

In the embodiment of FIG. 2, the V2X application server 250 may determine that the V2X messages are the type that need to be shared with other vehicles, which can be achieved using a Uu unicast downlink, PC5 broadcast or MBMS broadcast or multicast.

Figure 3:
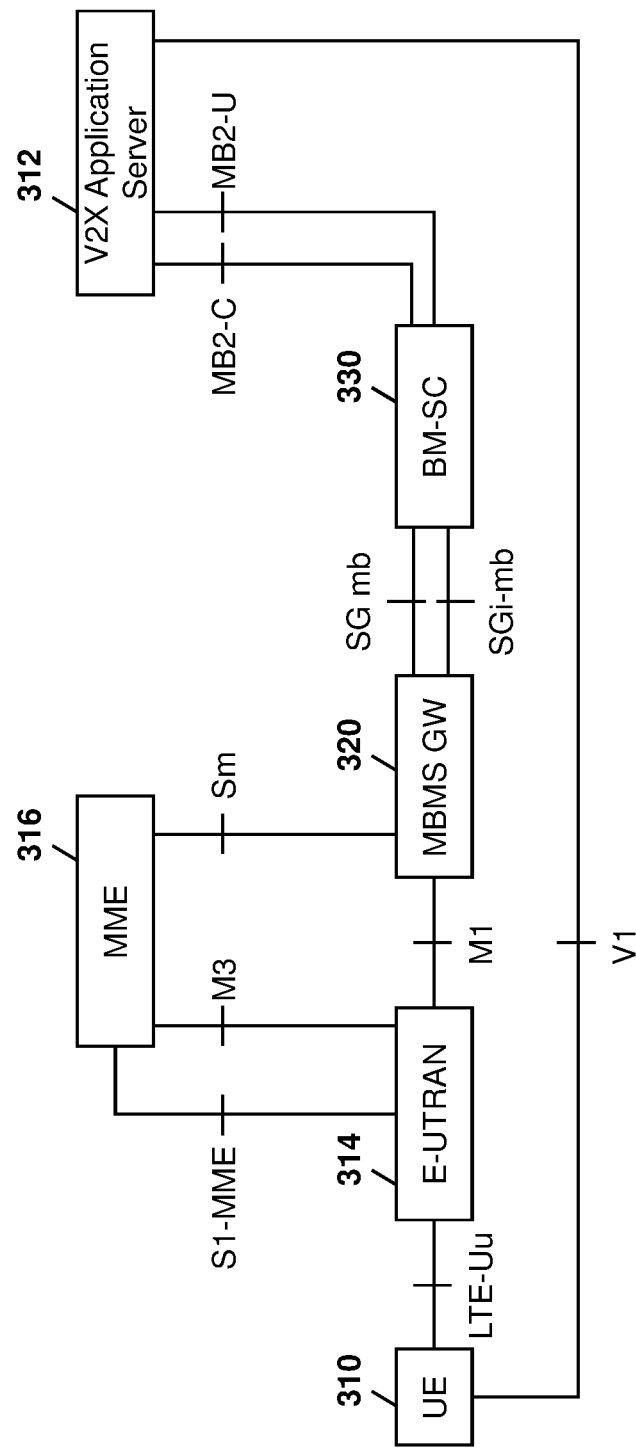
FIG. 3 is a block diagram showing an architecture for cellular broadcast for V2X communication.

For example, for MBMS, a reference architecture is provided with regard to FIG. 3 for LTE-Uu based V2X via MB2.

Specifically, referring to FIG. 3, a UE 310 may communicate with a V2X application server 312 utilizing a V1 reference point. This may be done utilizing, for example, an LTE-Uu interface between UE 310 and E-UTRAN 314.

The E-UTRAN 314 may then communicate with MME 316 using an S1-MME interface and M3 reference point.

Further, E-UTRAN 314 may communicate with the MBMS Gateway 320 utilizing an M1 reference point. MBMS Gateway 320 may further communicate with the MME 316 utilizing an Sm reference point.

A Broadcast/Multicast Service Center (BM-SC) 330 may communicate with MBMS Gateway 320 utilizing an SG mb or SGI-mb reference point.

Further, the BM-SC 330 may communicate with the V2X application server 312 using an MB2-C and MB2-U reference point for the control plane and user plane traffic respectively.

Using the architectures of FIGS. 2 and 3, these architectures may therefore be used for unicast uplink and/or downlink via an infrastructure. In particular, an ITS station such as a vehicle may utilize a Uu unicast uplink and downlink messaging between a V2X application and the E-UTRAN (or other, similar, enhanced Node B (eNB)). Such communication may be directed to the V2X application server, which may be used to deliver data to multiple users in an area using unicast messaging.

In this case, the V2X control function 252 may be used to provision the UE with the parameters needed for V2X communication and the MME 234 may be used to determine whether the ITS station is authorized to use V2X.

With regard to broadcast downlink transmissions via the infrastructure, the V2X application server may support delivering data to an appropriate target area. In this case, the V2X application service supports "network edge" deployment of MBMS. Further, the BM-SC 330 from FIG. 3 above provides functionality to support "network edge" deployment of MBMS.

From FIG. 3 above, the MBMS gateway 320 allows for IP multicast to multiple eNBs or E-UTRANs to allow communications with ITS stations communicating with different e-NBs.

While the embodiments above show an E-UTRAN and EPC, a cellular V2X system in accordance with the embodiments herein is not limited to an E-UTRAN and EPC. For example, the cellular V2X system could be a 5G-NR (New Radio) connected to an EPC, an E-UTRAN connected to a 5GCN (5G Core Network), 5G-NR connected to a 5GCN, a non-3GPP cellular system, among other options and combinations.

Side-Link Broadcast by Device

In a further embodiment, ITS stations may communicate through side-link communications in cellular V2X. The 3GPP feature on which this communication is based is called Proximity Services (ProSe). The interface is called PC5 and is a type of device to device (D2D) communication.

The term "side-link" refers to communication that is direct from a device to another device, in contrast to "uplink" which is from a device to a network or "downlink" which is from the network to a device.

Side-link communications include direct communications between devices, without necessarily involving any infrastructure. In the case of V2X, this could include a first ITS station broadcasting directly to other ITS stations in proximity. In addition, a device can be collocated with an infrastructure node, allowing ProSe communications between a device and an infrastructure node.

Thus, side-link communications can be done by an autonomous mode, in which no infrastructure components are utilized and transmitting ITS stations autonomously determine when to broadcast to other ITS stations. Alternatively, the side-link communication can be performed in a scheduled mode in which an infrastructure component such as an eNB may schedule the times at which an ITS station may transmit a message on the PC5 side-link interface.

Security in V2X

In V2X communications, there are various security challenges that need to be overcome. A first challenge concerns trust between the ITS stations. In particular, an ITS station may deliberately or unintentionally send out messages with incorrect content. Unintentional messaging may, for example, be based on sensor faults, among other options.

Receiving ITS stations would typically want to avoid acting on incorrect messages. Thus, a vehicle receiving an incorrect ITS message may, for example, unnecessarily apply its brakes, move over, among other options, thereby causing traffic problems. In some cases, this may be overcome by doing plausibility checks on information received in V2X messages and comparing such information with information received from other sensors such as video cameras, LIDAR, RADAR, among other options. However, this is not always possible.

A further security challenge in V2X deals with privacy. In particular, it may be desirable that no single entity be able to track a vehicle merely through V2X messaging. Thus, road users should be unable to track one another and, further, operators of a Security Credential Management System (SCMS) or wireless network operators should also be unable to track road users.

A further security challenge for V2X is integrity and replay protection. In particular, messages should be unable to be tampered with, for example utilizing a "man in the middle" attack. Messages previously transmitted and replayed should be detected.

A further consideration for security in V2X is non-repudiation. For example, if an accident occurs, senders of messages should not be able to deny that they sent such messages. This is especially true if such messages may be directly or indirectly causal in the accident.

Based on the above, a security credential management system has been and continues to be developed. The system involves a number of parties, including the Crash Avoidance Metrics Program (CAMP) industry consortium, the United States Department of Transportation, the United States National Highway Traffic Safety Administration, IEEE, and the Society for Automobile Engineers (SAE). Such groups have created a solution based on IEEE 1609, which is a series of standards for dedicated short range communications, as well as IEEE 802.11p with V2X application layer specifications provided by SAE. Security aspects are standardized in IEEE 1609.2. The solution sometimes goes by the name of DSRC/WAVE.

The CAMP have further defined an SCMS that is influencing both proof of concept pilots and work in various standards. Such security work is outlined in general below.

In particular, in a first aspect of security, a V2X message has a particular format. Typically, the V2X message comprises three main parts. The first part is the application message content. The second part is the signature of the message provided by the sending ITS station. The third part of the V2X message is a certificate which is signed by a certificate authority.

The CAMP uses elliptic curve Qu-Vanstone (ECQV) implicit certificates for V2X communication.

Based on the above, a vehicle or other ITS station could send a message signed with one of its private keys, referred to as a, and the corresponding implicit certificate, including for example (P, info) to the recipient ITS station. In the above, P is the public reconstruction key and info is the administrative information. The recipient extracts the sender's public verification key by calculating $eP+D$, where $e=hash(info,P)$ and D is a trusted copy of the certificate authority's public verification key, The receiver then uses the sender's public verification key to verify the signature on the message. This is for example illustrated in FIG. 4.

Figure 4:
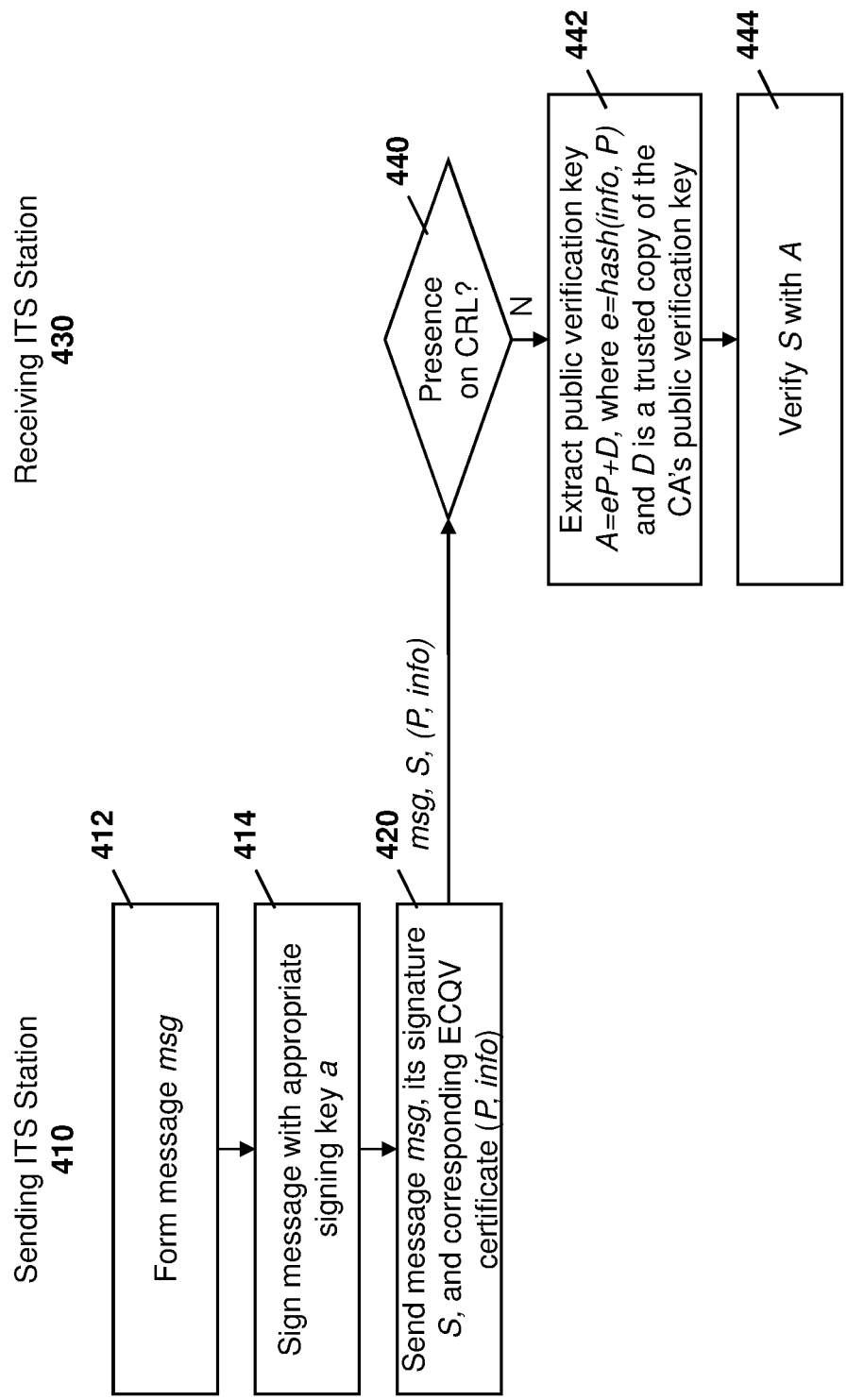
FIG. 4 is a dataflow diagram showing message security using a CRL.

Referring to FIG. 4, a sending ITS station 410 first forms a message at block 412. The sending ITS station then signs the message with an appropriate key a, shown by block 414.

The sending ITS station 410 then sends the message, its signature s, and the corresponding ECQV certificate (P, info) as shown by block 420.

The receiving ITS station 430 may then check a certificate revocation list for the presence of the certificate, as shown at block 440. The certificate revocation list is described in more detail below.

If the certificate is not on the certificate revocation list, the receiving ITS station 430 may then extract the public verification key $A=eP+D$. This is shown at block 442.

The receiving ITS station 430 may then verify S with A, as shown at block 444.

One issue with the above is that a vehicle with a single static certificate could be tracked by infrastructure network elements or by other road users. To avoid this, an ITS station may be assigned a number of certificates for a certain time period, after which such certificates are discarded. For example, a vehicle or other ITS station may be assigned twenty certificates within a given week, after which the certificates are discarded.

An ITS station may cycle through the certificates, using each one only for a certain time period before another certificate is used instead. For example, each certificate may be used for five minutes, after which the next certificate is used. Each certificate further may include a different pseudonym as an identifier. Such use of rotating certificates may prevent the tracking of the vehicle by infrastructure elements.

Misbehavior Authority

A misbehavior authority determines whether messages from an ITS station are trustworthy. If the misbehavior authority determines that an ITS station can no longer be trusted then the ITS station certificates are revoked.

In this way, recipients of the V2X messages may be able to check whether the received certificate is still valid and has not been revoked. This is typically done by putting certificate identifiers of untrustable certificates on a certificate revocation list.

However, such certificate revocation lists may become very large. In this example, each vehicle is issued with approximately 20 certificates per week and may be issued with many years' worth of certificates. In this regard, each vehicle or ITS station that has its certificates revoked would add many certificates to such certificate revocation list.

Further, a geographic region for CRLs may be large, leading to many ITS stations potentially being on the list.

In order to overcome this, CAMP has decided to use hash chains. A hash chain starts with a seed value and hashes it, and then hashes this hash, then hashes this hash and so on. The result is a sequence of values, called linkage seeds, each of which is the hash of the previous linkage seed. Linkage values may be generated from the linkage seeds.

When generating the ECQV certificates, the certificate authority places the kth linkage value (or a portion thereof) in the administrative portion of the certificate governing the kth time usage. To revoke an ITS station, the misbehavior authority places the current linkage seed in the CRL.

A recipient can quickly calculate the appropriate linkage value associated with a linkage seed on the CRL and compare it with the linkage value in the certificate. If the linkage values match, the certificate and its associated V2X message is rejected.

ITS stations can compute the linkage values associated with each linkage seed on the CRL on a weekly basis and save them in memory.

The above description is however simplified. The CAMP requires two sets of hash chains for privacy reasons. Each generally utilizes the above behaviour.

In CAMP, linkage values are generated by two Link Authorities (LA1 and LA2). Each generates a random linkage seed per ITS station, $Is_1(0)$ and $Is_2(0)$, respectively. The linkage authorities then generate linkage seeds iteratively for subsequent times i, $Is_1(i)$ and $Is_2(i)$, respectively, where i corresponds to a number for a week.

Linkage values are generated from these linkage seeds and are placed within the ECQV certificates. Two different linkage values are provided for each of the certificates that a vehicle may use within the given week. For time value (i,j), LA1 calculates the value $plv_1(i,j)$ as a function of $ID_{LA1}$, $Is_1(i)$, and j using AES and XOR. In this case, j corresponds with a given certificate that is used within the week i.

More specifically, the first linkage seed is used as a key in an AES operation to produce a set of bits which is XOR'd with the equivalent set of bits provided using the $2^{nd}$ linkage value, and this is what is provided in the certificate by the transmitting ITS stations. Such operations are performed by the certificate authority.

For each misbehaving ITS station, the CRL contains two linkage seeds, one from each link authority, from which the receiving vehicle can generate all possible linkage value pairs that might potentially be used by that misbehaving vehicle at any given time during that week or subsequent weeks. The vehicle receiving the V2X message performs the same AES and XOR operations as described above on the linkage value pairs derived from the linkage seed information in the CRL.

By comparing this sequence with the sequence received in the certificate, the V2X message receiving ITS station can determine whether a message should be discarded because it is sent by an untrustworthy vehicle.

With this system, neither link authority can track a particular vehicle without colluding with the other link authority.

Figure 5:
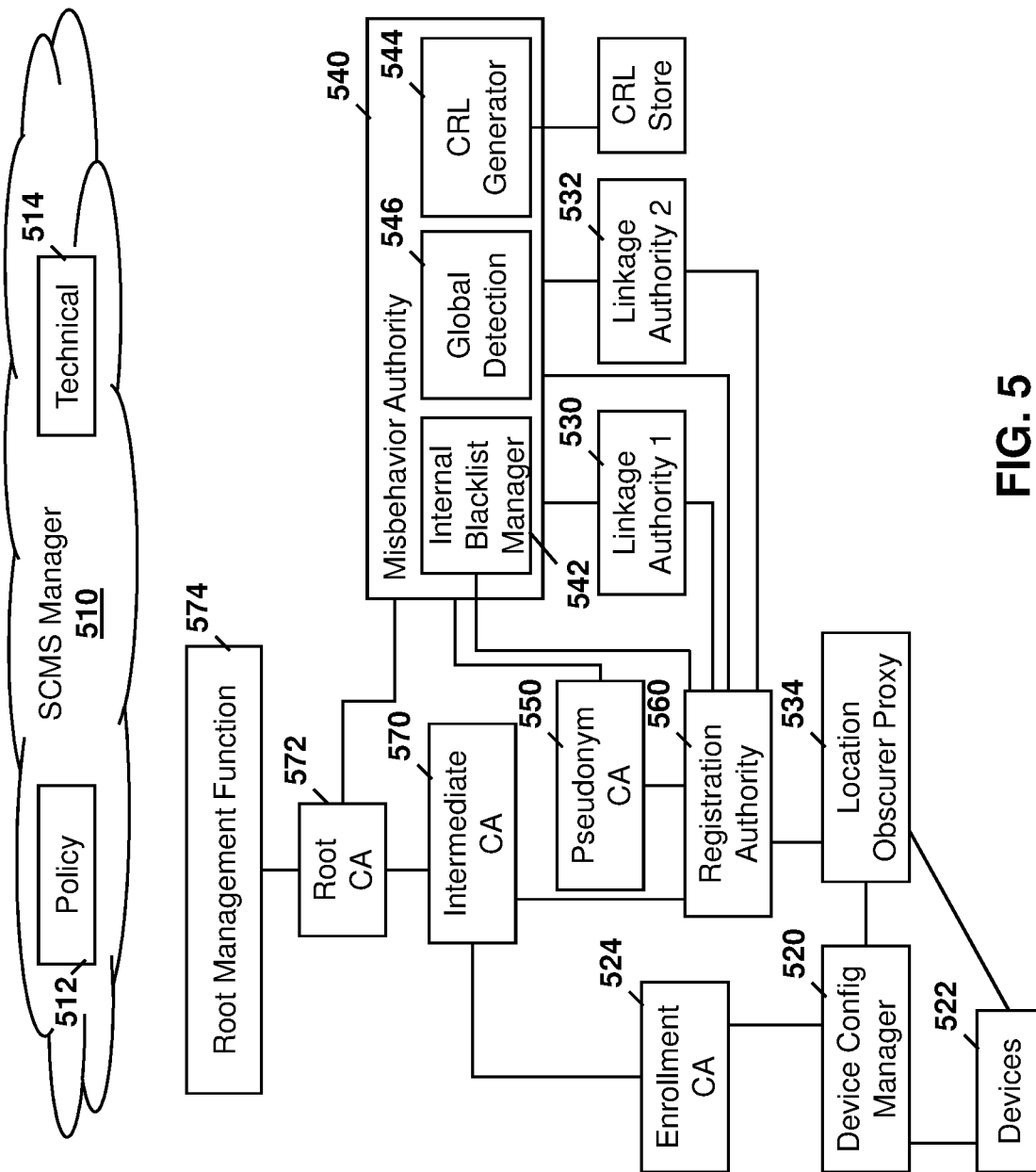
FIG. 5 is a block diagram showing certificate issuing authorities in a CAMP SCMS architecture.

Based on the above principles, a CAMP system architecture is described with regard to FIG. 5.

In particular, the embodiment of FIG. 5 provides a structure in which at least two logical roles need to collude in order to obtain enough information to track a vehicle and hence to mitigate against unauthorized collusion these two logical roles can be carried out by different organizations.

In the embodiment of FIG. 5, the SCMS manager 510 sets the misbehavior revocation policy, shown at block 512, and further provides technical information shown at block 514.

The device configuration manager 520 provides SCMS configuration information to various devices 522. For example, the device configuration manager 520 may provide network addresses, changes in network element certificates, among other information.

The enrolment certificate authority 524 issues enrollment certificates to the device, which the device can then use for obtaining pseudonym certificates, among other information. Further, different enrolment certificate authorities may issue enrolment certificates for different geographic regions, manufacturers or device types.

A linkage authority, such as linkage authorities 530 and 532, generates linkage values that are used in the certificates and support certificate revocation. The use of two linkage authorities prevents an operator of a single linkage authority from linking certificates belonging to a particular device and thereby prevents a single linkage authority from tracking devices.

A location obscurer proxy 534 changes device source address and prevents the linking of network addresses to location.

A misbehavior authority 540 determines which devices are misbehaving according to reports that it receives, and enters such devices on a blacklist managed by internal blacklist manager 542 and on the CRL, managed by CRL generator 544. The detection of misbehavior is done through a global detection module 546.

A pseudonym certificate authority 550 issues pseudonym certificates to devices, each certificate only being usable over a limited and specified time. Pseudonym certificate authorities may be limited to use for a particular geographic region, used by a particular manufacturer or used by a particular device type.

The registration authority 560 validates, processes and forwards requests for pseudonym certificates to the pseudonym certificate authority 550.

An intermediate certificate authority 570 is part of a chain of trust back to the Root CA 572 that enables the intermediate CA to issue certificates on behalf of the Root CA 572. A Root certificate authority 572 is a trusted entity which issues certificates that can be used to verify information or identity provided by the sender of the certificate. The Root CA may be managed by a root management function 574.

Utilizing the structure of FIG. 5, fast verification of signatures is possible. Fast signature verification as specified in IEEE 1609.2, section 5.3.1 as being a technique which can be used in the regular DSRC system to reduce processing burden when checking signatures. In particular, this section states:

This standard specifies use of the Elliptic Curve Digital Signature Algorithm (ECDSA) specified in Federal Information Processing Standard (FIPS) 186-4, optionally with the inclusion of additional information in the signature as specified in SEC 1 Version 2. See, also, Sect. 6.3.29: If the signature process followed the specification of SEC 1 and output the elliptic curve point R to allow for fast verification, R is represented as an EccP256CurvePoint indicating the choice compressed-y-0, compressed-y-1, or uncompressed at the sender's discretion.

CRLs

As described above, certificates can be used to verify data such as data contained in a V2X message. However, certificates can be revoked before their expiry date, therefore receiving entities need to be able to determine that an unexpired certificate has not been revoked. A Certificate Revocation List (CRL) provides a solution for this.

A CRL, in its basic form, is a list of digital certificates whose Certificate Authority (CA) has decided to revoke before the certificate's expiration date/time. CRLs are produced by Certificate Authorities for the certificates under their authority, and need to be distributed to, or fetched by, entities (for example, ITS endpoints) that need to handle certificates issued by that CA. CRLs are typically signed in order to provide integrity and authenticity. Entities receiving certificates need to check to see if the received certificate is indicated in the CRL obtained from the certificate's CRACA (each certificate contains an indication of its CRACA, for example a CracaID) as being revoked, and if so, should consider the data as untrustworthy e.g. as having received the data unsigned.

Only unexpired certificates are present on a CRL. In particular, once a certificate has expired, it no longer needs to be present on the CRL because entities receiving expired certificates will already treat such certificates as revoked.

CRLs can be distributed to an entity that needs them at any time (typically before the entity is expecting to start receiving certificates). However, the entity will always need to fetch/obtain a new CRL when receiving a certificate that has a CRACA that identifies a CRL for which the entity has no CRL or when the entity identifies a CRL that has already been obtained and that has expired.

In V2X, CRLs are the sole mechanism used to revoke certificates associated with ITS endpoints. ITS endpoints may use more than one certificate per V2X service, where typically 20-100 certificates are valid at a particular point in time, but each one can have a different start and duration/expiry time. Therefore, V2X CRLs are defined such that sufficient information is provided to revoke all certificates for a V2X service for an ITS endpoint, typically from a certain date/epoch.

Typically, ITS endpoints have one set of certificates per V2X service, therefore allowing individual V2X services per ITS endpoint to be revoked for that ITS endpoint.

CRLs, or sets of CRLs, are provisioned to ITS endpoints. For example, the generation and distribution of CRLs in the ETSI ITS is specified in ETS TS 102 941, "Intelligent Transport Systems; Security; Trust and Privacy Management", as for example found in version 1.2.1, May 2018. A structure for such CRL may for example be found in Annex A of this technical specification.

In another example, IEEE defines CRL in the 1609.2, "IEEE Standard for Wireless Access in Vehicular Environments—Security Services for Applications and Management Messages", 1013.

The ITS endpoints, once provisioned with CRLs, can then interrogate the CRLs every time V2X messaging is received from other ITS endpoints, in order to determine if the certificate received from the other ITS endpoint in the V2X message has been revoked, and consequently if the sending ITS endpoint can be trusted. If received V2X messaging is found to contain a certificate that is present on a CRL, then the receiving ITS endpoint deems the sending ITS endpoint untrustworthy and may take appropriate action. For example, such action may include ignoring or silently discarding the received V2X messaging from that ITS endpoint.

ITS endpoints that are untrusted are also known as "misbehaving vehicles" or "misbehaving ITS endpoints". It is possible an ITS endpoint could be deemed untrusted/misbehaving for one or more V2X services and trusted/behaving/not misbehaving for one or more other V2X services.

Depending on how many certificates have been issued by a CA, for what length of time (i.e. validity period), and how many ITS endpoints have been deemed misbehaving for one or more V2X services, a CRL could be quite extensive as well as be subject to many/frequent updates.

Online Certificate Status Protocol (OCSP) and OCSP Stapling

OCSP is a client-server protocol that is used by a client for obtaining the revocation status of the digital certificate from a server. For example, OCSP is defined in the Internet Engineering Task Force (IETF) Request For Comments (RFC) 6960, "X.509 Internet Public Key Infrastructure Online Certificate Status Protocol—OCSP", June 2013.

The certificate being revoked may, for example, be an X.509 digital certificate in some cases.

Upon receiving the digital certificate, for example as part of a signed message, an OCSP client queries an OCSP server to determine if the certificate is valid and has not been revoked.

According to IETF RFC 6066, "Transport Layer Security (TLS) Extensions: Extension Definitions", January 2011, the OCSP server may then provide an OCSP response indicating one of the following states of the received certificate: Good, Revoked, Unknown.

The OCSP server may also include other information, including a "thisUpdate" field and a "nextUpdate" field, similar to fields contained in CRLs. This other information together provides a start and end time/date of the validity of the OCSP response. In other words, the fields define a period of validity of the OCSP response.

The OCSP server may alternatively provide an error, for example based on a malformed OCSP request.

OCSP stapling is also known as "TLS certificate status request extension". This may, for example, be defined in IETF RFC 6066 and also IETF RFC 6961, "The Transport Layer Security (TLS) Multiple Certificate Status Request Extension", June 2013.

OCSP stapling modifies OCSP in that instead of an entity that receives a certificate having to contact the OCSP server, the entity that intends to send a certificate first contacts an OCSP server using the above-described mechanism, receives a time-stamped OCSP response, and then appends or "staples" the time stamped OCSP response to the certificate that it sends out. The appended/stapled time stamped OCSP response proves to all receiving entities that the received certificate is valid for a specific period of validity. In other words, the certificate has not been revoked.

Stapling therefore negates the requirement for clients receiving digital certificate or data signed by a digital certificate to contact the certificate authority that issued the certificate using OCSP themselves, or indeed to check the received certificate against a CRL.

IETF RFC 6066 describes more details of messaging that is used as part of the TLS mechanism in a typical case of a web client accessing a server. During the TLS handshake, the web client may request the server to provide an OCSP response, which the server staples to the certificate that the server provides to the client. The client makes this request by including a CertificateStatusRequest in the TLS handshake.

The contents of an OCSP response are defined in IETF RFC 6960.

The contents of a regular OCSP request are also defined in IETF RFC 6960.

Tailored CRLs

The use of large CRLs can be onerous for both processing and in terms of memory for ITS stations that are the recipients of V2X messages. Each ITS station must compare an identifier of the certificate of each received message with the identity of all certificates indicated by the CRL. The comparing would determine whether the message can be trusted.

For example, in an urban environment, an ITS station could receive around 1000 signed messages each second, based on 100 vehicles or ITS stations in proximity to each other, where each ITS station is sending 10 messages per second. The messages may, for example, be Basic Service Messaging.

Additionally, there may be potentially wasted cellular resources in provisioning large CRLs or sets of CRLs to ITS stations. Resources are also wasted in conveying cellular network messages in the downlink that are merely going to be discarded by the ITS station receiver.

Based on this, in accordance with the embodiments of the present disclosure, tailored CRLs may be provided to ITS endpoints based on time, location and/or destination, among other factors.

Specifically, rather than sending an ITS endpoint one or more CRLs containing all certificates which are known to be revoked or unknown, referred to herein as a "full CRL", which may contain data that the requesting endpoint may never need because it is unlikely that the vehicle will be in proximity with a plurality of the ITS endpoints whose certificate are on the master CRL, a CRL tailored for the requesting ITS endpoint is provided instead. This CRL may be referred to as a "tailored CRL" and may be the same or smaller in size compared to a full CRL.

Furthermore, the tailored CRL could be empty or contain no data because the CRL requesting ITS endpoint does not need any CRLs from the full CRL at all. For example, if all certificates on the CRL relate to ITS endpoints that the CRL requesting ITS endpoint may never need to communicate with, the tailored CRL could be empty.

A full CRL may be modified to a tailored CRL by including in the tailored CRL only the revoked certificates belonging to other ITS endpoints that the CRL requesting ITS endpoint is likely to encounter within a certain time period and/or while the ITS endpoint is located within a particular geographic area. Further, in some cases, the tailored CRL may be created to accommodate a full route for the V2X vehicle. Therefore, if the server knows the route that the V2X vehicle will be taking then the CRL may include certificates for all vehicles that the target vehicle may encounter while driving on that route. As will be appreciated, this takes into account both geography and time.

To obtain one or more tailored CRLs, a CRL requesting ITS endpoint may utilize one or more CRL provisioning servers and optionally one or more CRL provisioning proxies, both of which are accessed via a data connection. An ITS endpoint is then provided with a tailored CRL, or a full CRL containing data necessary for the ITS endpoint itself to create a tailored CRL. Embodiments for providing the tailored CRL or allowing a ITS endpoint to create its own CRL are described below.

The tailored CRL may be determined by a CRL provisioning server, CRL provisioning proxy and/or ITS endpoint based on one or more of:

A current location of the CRL requesting ITS endpoint;
Current or last known locations of the ITS endpoints whose one or more certificates are on a full CRL;
An intended journey of the CRL requesting ITS endpoint;
Intended journeys of the ITS endpoints whose one or more certificates are on a full CRL; and
Fields or identity fields of one or more certificates that the CRL requesting ITS endpoint has received recently or within a specified time period and optionally also within a particular location from other ITS endpoints.

The CRL provisioning server and/or CRL provisioning proxy can determine the location of other ITS endpoints and thus create one or more tailored CRLs. Such tailored CRL is created for the CRL requesting ITS endpoints based on the above-mentioned information being received from CRL requesting ITS endpoints who have one or more certificates on one or more full CRLs, from roadside units, among other entities.

For certificates indicated on a full CRL whose associated ITS endpoint location and intended journey details are unknown, such certificates may always be included in tailored CRLs derived from the full CRL.

Architecture

In accordance with the embodiments of the present disclosure, an architecture for performing the embodiments herein consists of at least one of the following nodes.

In some embodiments, a first node may be an ITS endpoint. In particular, an ITS endpoint may be any entity that can send and/or receive V2X-related messaging. Examples of ITS endpoints include vehicles, roadside units, user equipments, among others.

A second node in the architecture may be a CRL provisioning server. In particular, a CRL provisioning server is a functional entity that provides ITS endpoints with one or more CRLs, and which may be associated with a CRACA or known as a CRACA. The CRL provisioning server may also be known as a CRL store, a distribution center, among other definitions. In some embodiments, the CRL provisioning server may be an RSU.

A third node potentially in the architecture may be a CRL provisioning proxy. In particular, a CRL provisioning proxy is a functional entity that proxies messages between vehicles and CRL Provisioning Servers and that may add additional data/information to the messages that it proxies. The CRL provisioning proxy may be collocated with the CRL Provisioning Server. Further, in some cases the CRL provisioning proxy may be an RSU.

Figure 6:
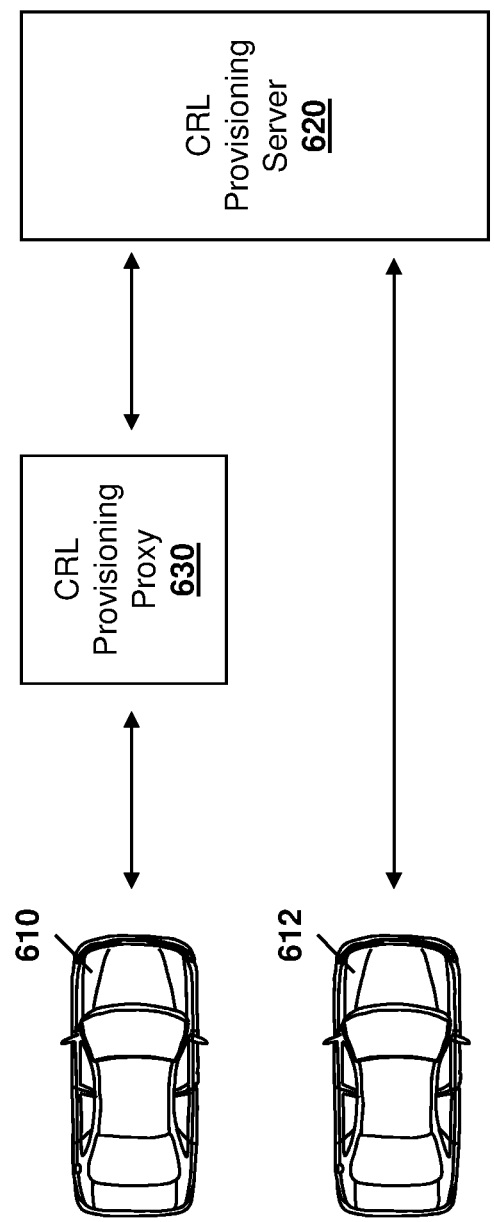
FIG. 6 is a block diagram of ITS endpoints interacting with a CRL provisioning proxy or CRL provisioning server.

Reference is now made to FIG. 6. In the embodiment of FIG. 6, an ITS endpoint 610 and ITS endpoint 612 may be any endpoint that has the capability of communicating with V2X servers. In particular, in the embodiment of FIG. 6, the ITS endpoints are vehicles. However, in other cases, different ITS endpoints may be used.

ITS endpoint 610 may communicate with a CRL provisioning server 620 via a CRL provisioning proxy 630. In other cases, an ITS endpoint 612 may communicate directly with the CRL provisioning server 620.

In both cases, other nodes or network elements may be present in the path of the communication and are not shown in the embodiment of FIG. 6 for simplicity.

Various deployment architectures for ITS endpoints to communicate with a CRL provisioning proxy and/or a CRL provisioning server are possible.

Figure 7:
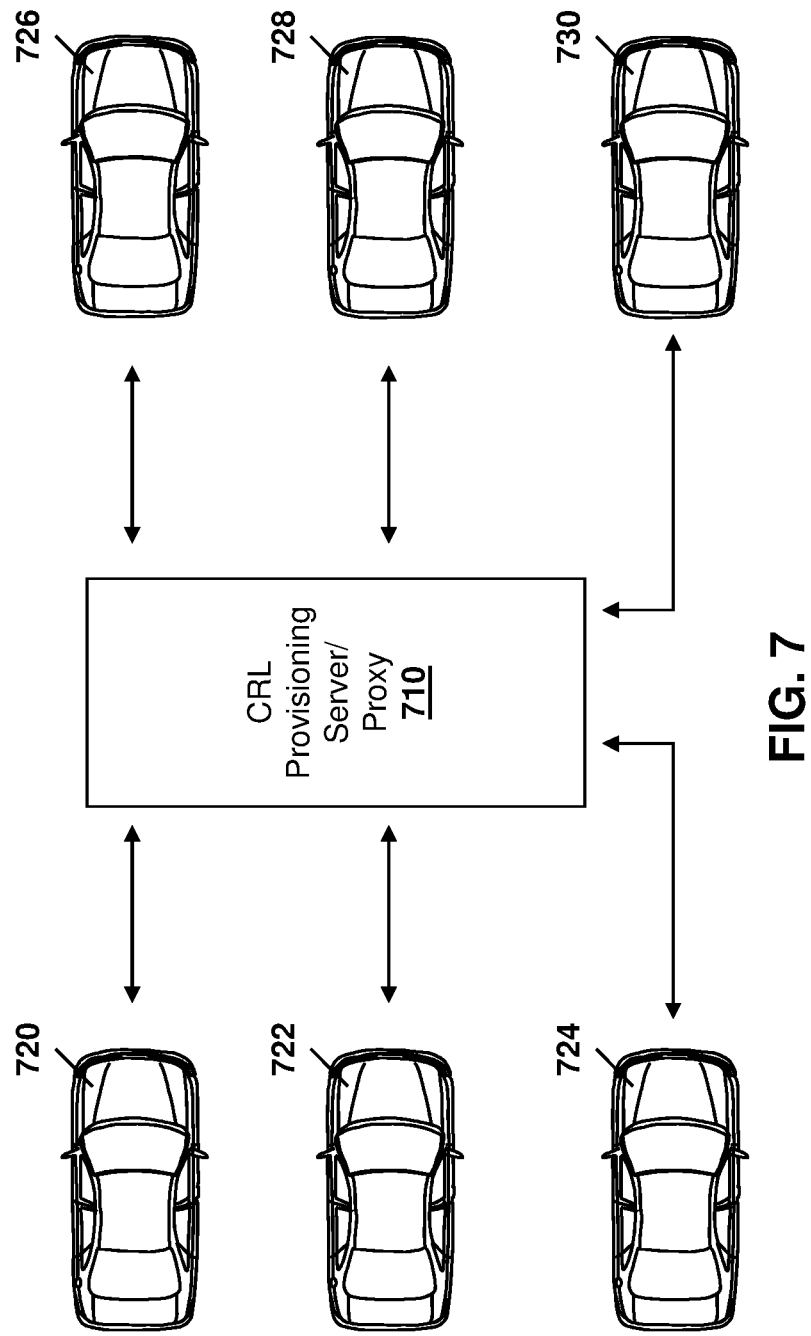
FIG. 7 is a block diagram of a plurality of ITS endpoints interacting with a single CRL provisioning server/proxy.

For example, reference is now made to FIG. 7. The embodiment of FIG. 7 shows a first deployment architecture in which a single CRL provisioning server or CRL provisioning proxy 710 may serve ITS endpoints 720, 722, 724, 726, 728 or 730, regardless of the location of such endpoints.

Figure 8:
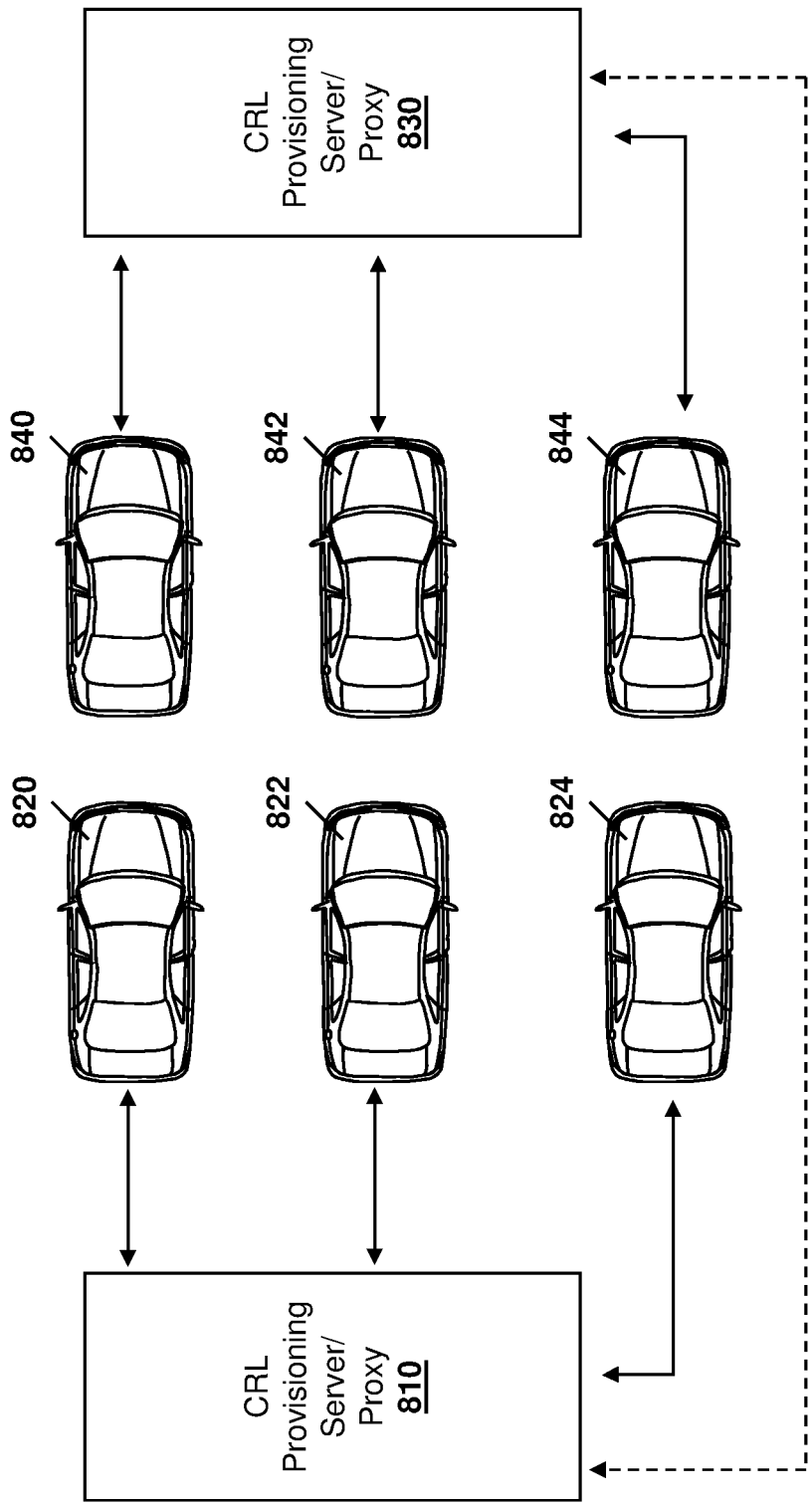
FIG. 8 is a block diagram of a plurality of ITS endpoints interacting with a plurality of CRL provisioning servers/proxies.

In the embodiment of FIG. 8, a second deployment architecture is shown. In this case, a CRL provisioning server or proxy 810 may serve ITS endpoints 820, 822 and 824. A second CRL provisioning server or proxy 830 may serve ITS endpoints 840, 842 and 844. The division may be based on different geographical positions or locations in some cases. In other cases, characteristics of the ITS endpoints may be tied to a particular CRL provisioning server or proxy.

In the embodiments of FIGS. 6, 7 and 8, the CRL provisioning server could consist of multiple physical nodes that may be used to allow for fail-over, load-balancing, among other options. In other words, a cluster of CRL provisioning servers could be provided when a CRL provisioning server is referred to above.

The CRL provisioning servers and CRL provisioning proxies of FIGS. 6, 7 and 8 may be located within a network of a cellular or mobile network operator, or may belong to a vehicle manufacturer or service provider, among other options.

ITS Endpoint Communicates with a CRL Provisioning Server

In one embodiment of the present disclosure, the ITS endpoint may communicate with a CRL provisioning server, and the CRL provisioning server may be used to provide to the ITS endpoint one or more tailored CRLs.

Figure 9:
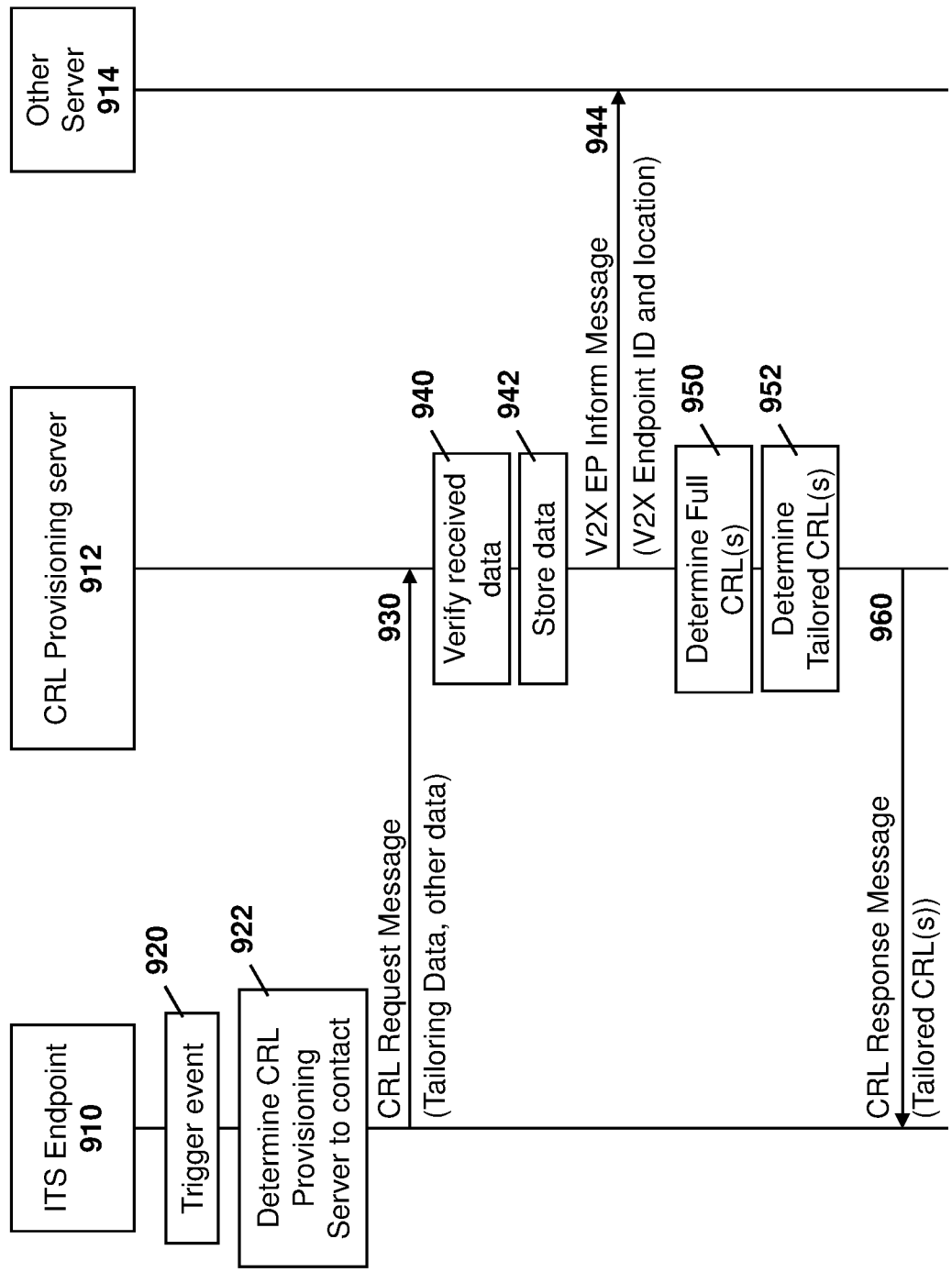
FIG. 9 is a dataflow diagram showing an ITS endpoint receiving one or more tailored CRLs from a CRL provisioning server.

Therefore, reference is now made to FIG. 9. In the embodiment of FIG. 9, an ITS endpoint 910 communicates with a CRL provisioning server 912. A further or other server 914 may also be part of the network.

The embodiment of FIG. 9 is a simplified diagram, and there may be one or more additional nodes between the ITS endpoint and CRL provisioning server. For example, such additional nodes may be used for routing or proxying messages in some cases.

In the embodiment of FIG. 9, the ITS endpoint 910 may have a trigger event 920. The trigger event may be either that the ITS endpoint receives an indication and/or a trigger event occurs in the ITS endpoint. The trigger event could be one or more of the following. In a first case, the trigger event may be a time limit of the CRL previously received from a CRL provisioning server that has been exceeded or expired.

In a further case, the trigger event may be a geographical area limit of a CRL previously received from a CRL provisioning server that has exceeded or expired based on a current location of the ITS endpoint.

A third case for the trigger may be that the ITS endpoint has determined it requires a CRL which it does not have. For example, the ITS endpoint may receive V2X message from a different ITS endpoint which contains a certificate with a certificate authority field for which the ITS endpoint has no associated CRL.

Other options for trigger events are possible.

Upon the trigger event occurring, the process of FIG. 9 proceeds to block 922 in which the ITS endpoint determines one or more addresses for a CRL provisioning server to which to connect. The determination may include one or more of the following. In a first instance, the information may be found by reading configuration data from storage available to the ITS endpoint, which may have been received via unicast, multicast or broadcast to the ITS endpoint. For example, the message may have been received via cellular radio access network, via Wi-Fi 802.11 radio network, via an ethernet connection, via a power connection such as through a wired outlet, a wireless charging station, among other options.

In another instance, the address may be found by constructing a Fully Qualified Domain Name (FQDN) using a specific format and specific input parameters. The input parameters may be used to determine aspects of the FQDN such as labels, and the parameters are determined using configuration data or one or more of the following: location data, e.g. Public Land Mobile Network (PLMN) ID, PLMN area ID (e.g. Location Area Identity (LAI), Tracking Area Identity (TAI), Routing Area Identity (RAI), Cell Global Identity (CGI), etc.), GNSS coordinates, among other such information. In other cases, the location may be determined based on radio access networks currently available. For example, cellular networks may be identified by the PLMN ID such as the Mobile Country Code (MCC) and Mobile Network Code (MNC). Wi-Fi networks may be identified by the Service Set Identifier (SSID), Extended SSID (eSSID), Broadcast SSID (BSSID), among others.

In other cases, the identifier may be the date, day and/or time of day.

The one or more addresses obtained from one or a combination of the above may for example be IP addresses, fully qualified domain names, domain names that may be further resolved using a DNS server, among others. Resolution of the determined one or more addresses may be necessary in some cases, for example using DNS.

The one or more addresses obtained from one or a combination of the above reading or constructing may also be associated with one or more of the following, which would result in a different one or more addresses being obtained, depending on factors such as location, date, time, available radio access networks among others. Such information or factors may include location data such as PLMN ID, PLMN area ID including LAI, TAI, RAI, CGI, or other similar identifiers, GNSS co-ordinates, among other factors. Radio access networks currently available including cellular networks identified by for example for PLMN ID such as the MCC and MNC, Wi-Fi networks identified by the SSID, eSSID, BSSID, among others, may also be factors.

Date, day and/or time of day may also be used to identify servers, and in some cases may allow for graceful commissioning of new servers, graceful decommissioning of existing servers, among other options.

The actions at block 922 are typically performed after the ITS endpoint has determined the CRACA. For example, the determination may be done using the cracaID in the received certificate.

After block 922, the ITS endpoint 910 sends message 930 to the CRL provisioning server 912. The message 930 may be a CRL request message. In some cases, the request message may contain tailoring data as described below.

In some cases, the ITS endpoint location may be omitted from the tailoring data if a CRL provisioning server is contacted on a per location basis, for example as depicted in FIG. 8 above.

On receiving message 930, the CRL provisioning server 912 may then verify the tailoring data and/or CRL requesting ITS endpoint, as shown at block 940. The verification may involve the CRL provisioning server determining additional data not received in the tailoring data.

The determination of additional data by the CRL provisioning server 912 has the benefit of potentially mitigating issues such as a misbehaving ITS endpoint inserting incorrect location information, incorrect source ITS endpoint identities or identifiers, among other factors.

On receiving message 930 and optionally verifying the received data, the CRL provisioning server, at block 942, may bind the received and/or determined and/or verified location information of the ITS endpoint along with a ITS endpoint identity or identifier, and then store this binding. The stored data may then be used, for example, when the CRL provisioning server receives one or more requests for a tailored CRL from other ITS endpoints and needs to determine the contents of the tailored CRL for the other ITS endpoints. In particular, a location, time, destination and/or other data is associated with the ITS endpoint, and can be used when creating tailored CRL(s) for other ITS endpoints.

In some cases, CRL provisioning server 912 may then optionally send information message 944 to the other server 914. The information message 944 may inform the other entity such as the CRL provisioning server, central location data server, or other network node, of the location of the ITS endpoint, for example at the time that the CRL request message was received, and may include location information data, destination data, and/or an ITS endpoint identity or identifier of the ITS endpoint. This may be used in a multi-CRL provisioning server architecture such as that described with FIG. 8 above.

On receipt of message 944, the other server 914 may then store the received location information data, route data, and/or ITS endpoint identifier.

The CRL provisioning server 912 may then determine the full CRL for the ITS endpoint as shown at block 950. In particular, the CRL provisioning server may determine between zero and a plurality of the full CRLs for the CRL requesting ITS endpoint. The determination, for example, may be done by receiving the tailoring data in the message 930.

If no full CRLs are determined, then the CRL provisioning server 912 may send a message indicating no full CRLs are available to the CRL requesting ITS endpoint 910, and no further steps are processed. This would typically be an error message.

Conversely, if one or more full CRLs are determined, then the process proceeds to block 952 in which a tailored CRL for each full CRL may be determined. Tailored CRLs may be determined using the full CRL and the tailoring data received in message 930, and may also be optionally determined using other data received in the CRL request message 930.

For example, the tailored CRL may contain only certificates of other ITS endpoints likely to be encountered by ITS endpoint 910 for a certain time period, within a certain geographic area, along a specified route, among other options.

On determining the tailored CRL, the CRL provisioning server 912 may then send a response message 960 to the ITS endpoint 910. The response message 960 includes the tailored CRL and expiration data. Expiration data included by the CRL provisioning server in the CRL response message 960 may depend on data that was received in the CRL request message 930, such as the tailoring data or other data. The expiration data may contain one or more of a combination of the following:

A time limit, which may, but does not need to be, the same as the time limited contained in the full CRL. For example, this information may be in the next update field, in the next CRL fields, among other options.

In some cases, the time limit may be a relative expiration date or time which is relative to the time that the ITS endpoint receives the CRL response message. In other cases, the time limit may be an absolute expiration time or date.

In some cases, a CRL provisioning server may receive a geographical area limit. For example, this may include a relative position change relative to the position of the ITS endpoint reported in the CRL request message 930. In other cases, the geographical area limit may be based on an absolute position.

The ITS endpoint 912 receives the CRL response message from the CRL provisioning server and then stores such information.

In one alternative embodiment, rather than the determination at block 960 occurring at the CRL provisioning server, an ITS endpoint 910 may determine its tailored CRL. In this procedure, the ITS endpoint communicates with a CRL provisioning server and the CRL provisioning server may provide the ITS endpoint with one or more full CRLs. The ITS endpoint may then determine and store the one or more tailored CRLs.

Figure 10:
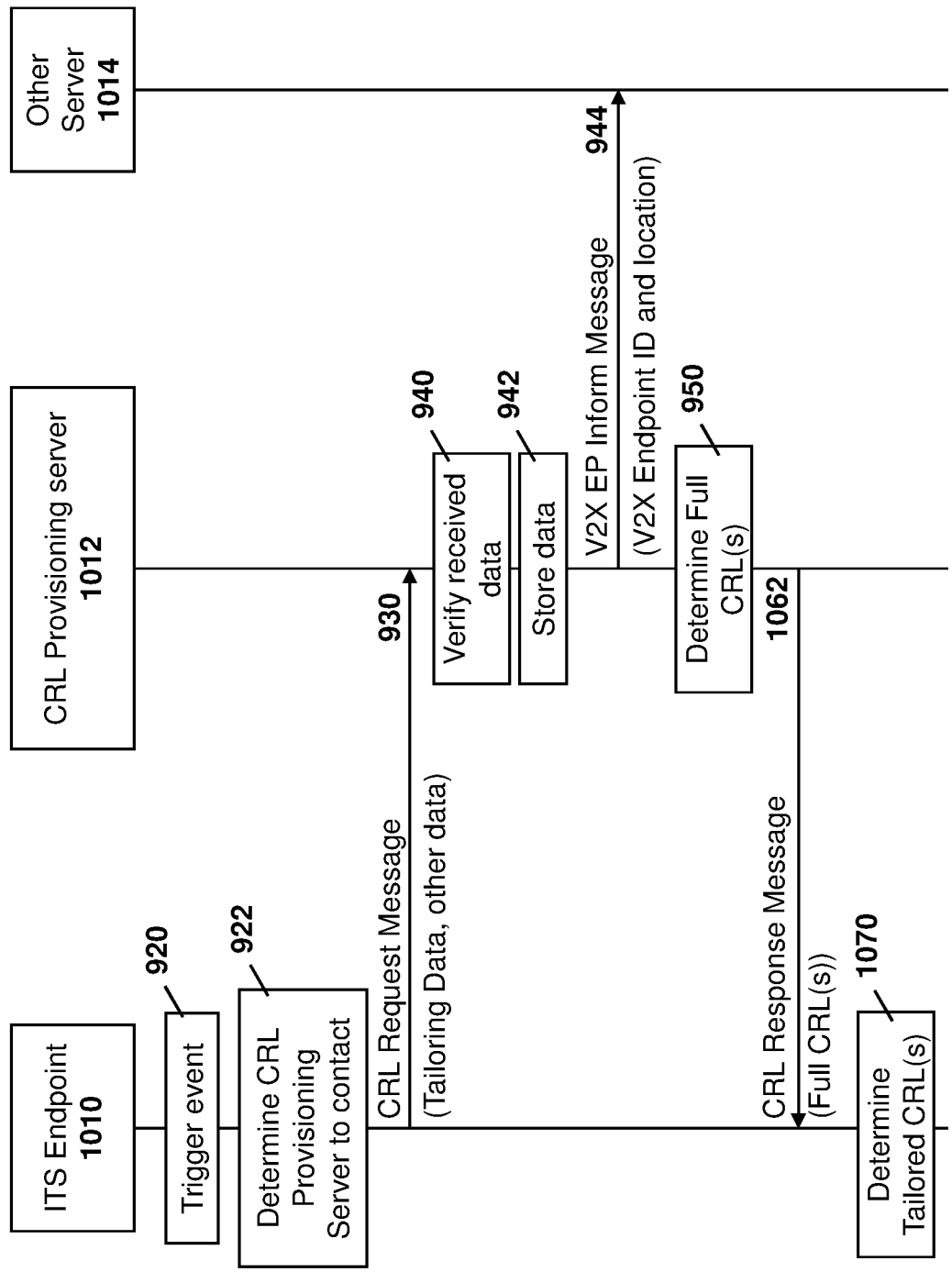
FIG. 10 is a dataflow diagram showing an ITS endpoint receiving one or more full CRLs from a CRL provisioning server and determining one or more tailored CRLs.

In particular, reference is now made to FIG. 10. In the embodiment of FIG. 10, an ITS endpoint 1010 communicates with the CRL provisioning server 1012. The CRL provisioning server may communicate with other server 1014.

The blocks and messaging that are similar to those described above with reference to FIG. 9 are referenced with the same reference numerals in FIG. 10. In particular, ITS endpoint 1010 may have a trigger event as shown by block 912.

The ITS endpoint 1012 may then determine the CRL provisioning server to connect to at block 922.

The ITS endpoint 912 may then send the CRL request message 930 to the CRL provisioning server 1012. The CRL request message 930 may contain tailoring data and other data.

The CRL provisioning server may then verify the received data at block 940 and store the data at block 942.

The CRL provisioning server may then provide information message 944 to the other server 1014.

In the embodiment of FIG. 10, the CRL provisioning server may then determine the full CRL at block 950.

In the embodiment of FIG. 10, the CRL provisioning server 1012 may then provide the CRL response message 1062 back to the ITS endpoint 1010. In this case, the CRL response message 1062 includes one or more full CRLs. Such one or more full CRLs may contain information about each certificate that allows the ITS endpoint to make a tailoring decision, such as a most recent location for each endpoint in the full CRL, a time the endpoint last communicated, and/or a route for the endpoint, among other options. If the CRL does not contain such information for the one or more endpoints, such one or more endpoints may be kept in the tailored CRL.

In some cases, the CRL response message 1062 may be a delta containing only information that has changed since the last full CRL was sent to the ITS endpoint 1010. A delta, as used herein, therefore only contains information that has changed and therefore is smaller than a full CRL. This may be done to save bandwidth in the messaging with ITS endpoint 1010.

On receipt of the CRL response message 1062, ITS endpoint 1010 may determine and store a tailored CRL for each full CRL that contains location data for one or more entities as received in message 1062. This determination and storing of the tailored CRL is shown at block 1070 in the embodiment of FIG. 10. The determining at block 1070 may also use other information provided within the response message 1062.

As a variation of the embodiment of FIG. 10, the CRL response message 1062 may be sent by a CRL provisioning server 1012 to one or more ITS endpoints without first receiving the CRL request message 930. In other words, message 1062 may be sent as a broadcast or multicast message to multiple ITS endpoints. In this case, the CRL request message 930 may be referred to as an ITS endpoint CRL report message and the CRL response message 1062 may be referred to as a CRL provisioning server report in this variation.

ITS endpoint 1010 may send a message 930 to the CRL provisioning server periodically in order to provide tailoring data to enable CRL provisioning server to provide location data for one or more entities within the one or more full CRLs included in the CRL provisioning server report. However, the CRL provisioning server may determine location data for one or more entities within the one or more full CRLs included in the CRL provisioning server report using other means, such as information received from roadside units, from other ITS endpoints, among other options.

ITS Endpoint Communicates with a CRL Provisioning Proxy

In a further embodiment, an ITS endpoint may communicate with a CRL provisioning proxy. The CRL provisioning proxy may obtain one or more full CRLs from a CRL provisioning server and determine one or more tailored CRLs. The CRL provisioning proxy may then provide the ITS endpoint with the one or more tailored CRLs.

One advantage of utilizing a provisioning proxy is that existing or legacy CRL provisioning servers do not need to be upgraded or enhanced for the tailoring of CRLs. Instead, the CRL provisioning proxy can be provided by an entity that already has provisioning or location information for the ITS endpoint.

In this regard, in one embodiment the CRL provisioning proxy may serve as a single point of contact for all possible CRLs that the ITS endpoint may need.

While the embodiment described below shows communication between the ITS endpoint and the CRL provisioning proxy, in practice there may be one or more additional nodes between the ITS endpoint and the CRL provisioning proxy. Further, there may be one or more additional nodes between the CRL provisioning proxy and between the CRL provisioning server. Such additional nodes are not shown in the figures below for clarity.

Figure 11:
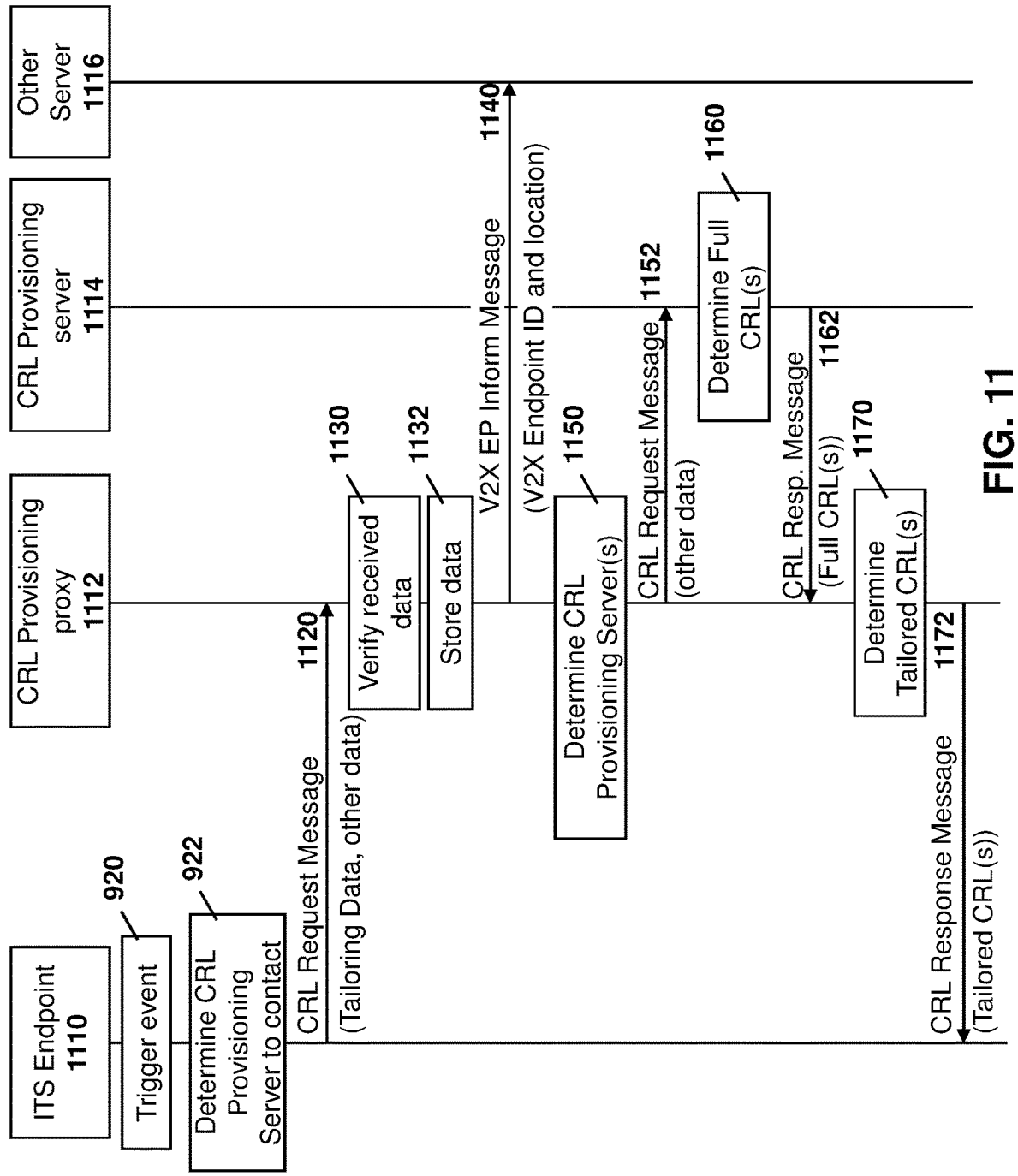
FIG. 11 is a dataflow diagram showing an ITS endpoint receiving one or more tailored CRLs from a CRL provisioning proxy.

Reference is now made to FIG. 11. In the embodiment of FIG. 11, an ITS endpoint 1110 communicates with the CRL provisioning proxy 1112. Further, the CRL provisioning server 1114 may provide full CRLs to the CRL provisioning proxy 1112.

The ITS endpoint 1110 may, at block 920, receive a triggering event. Block 920 may have the same functionality as that described above with regard to FIGS. 9 and 10.

Based on the triggering event, the ITS endpoint 1110 may determine which CRL provisioning server to contact at block 922. The functionality of block 922 may be the same as that described above with regard to FIGS. 9 and 10.

ITS endpoint 1110 may then send a CRL request message 1120 to the CRL provisioning proxy 1112. The message 1120 may contain various information such as data regarding locations, and tailoring data for the ITS endpoint.

However, in some embodiments the location of the ITS endpoint may be omitted from the tailoring data if a CRL provisioning proxy is contacted on a per location basis. For example, this may be the case if the architecture shown in FIG. 8 above is used.

Once the CRL provisioning proxy 1112 receives message 1120, the CRL provisioning proxy may verify the received data at block 1130. The CRL provisioning proxy may verify the tailoring data within the message 1120 and/or the CRL requesting ITS endpoint, which may involve the CRL provisioning proxy finding additional data not received in the tailoring data.

The verification at block 1130 may have the benefit of potentially mitigating such issues as misbehaving UEs providing incorrect location information, incorrect source of ITS endpoint identifiers, among other such misbehaving UE data.

The CRL of provisioning proxy 1112 may then store the data at block 1132. In particular, the CRL provisioning proxy 1112 may bind the received and/or determined and/or verified location information of the ITS endpoint along with the ITS endpoint identifier, and store this binding at block 1132. The information may be used, for example, when the CRL provisioning proxy receives one or more requests for a tailored CRL from other ITS endpoints and needs to determine the content of the tailored CRL for other ITS endpoints as described below.

In some embodiments, the CRL provisioning proxy 1112 may send a CRL inform message 1140 to inform another entity 1116 of the location of the ITS endpoint 1110. The other entity may, for example, be a CRL provisioning server, a central location data server, or any other network node.

Message 1140 may be sent, for example, at the time that message 1120 was received by CRL provisioning proxy 1112. Message 1140 may include location information data, route or destination information, and/or an ITS endpoint identifier. Message 1140 may be used, for example, in a situation where multi-CRL provisioning server architectures are utilized. For example, such multi-CRL provisioning server architecture may include the embodiment of FIG. 8 above.

The CRL provisioning proxy 1112 may then, at block 1150, determine zero or more CRL provisioning servers to obtain zero or more full CRLs for the CRL requesting the ITS endpoint. The determination may be made based on the tailoring data received at message 1120 for example. In other cases, the determination may be made based on other data such as the certificate authority for the ITS endpoint, among other options.

If no CRL provisioning servers are determined, then the CRL provisioning proxy 1112 may send the message to ITS endpoint 1110 that no full CRLs are available. This may be treated as an error message and no further steps are then processed by the CRL provisioning proxy 1112.

If one or more CRL provisioning servers are determined, then the processing continues.

In particular, the CRL provisioning proxy 1112 may send a CRL request message 1152 to the one or more determined CRL provisioning servers 1114. Message 1152 may contain data indicating one or more full CRLs that are wanted or required, and may also include other data that, for example, was received in message 1120.

The CRL provisioning server 1114 receives message 1152 and may then determine a full CRL list at block 1160. If no full CRLs are determined then the CRL provisioning server 1114 may send a message indicating an error to the CRL provisioning proxy 1112 and no further steps are taken.

Conversely, if one or more full CRLs are determined, then the CRL provisioning server 1114 sends message 1162 back to CRL provisioning proxy 1112. Message 1162 may contain a one or more full CRLs for the ITS endpoint 1110.

In some cases, the CRL response message 1162 may be a delta containing only information that has changed since the last full CRL was sent to the CRL provisioning proxy 1112. This may be done to save bandwidth in the messaging with CRL provisioning proxy 1112.

CRL provisioning proxy 1112 receives message 1162 and may then determine a tailored CRL for the ITS endpoint 1110 at block 1170. In particular, the tailored CRL may be determined using the tailoring data received at message 1120 and may optionally be determined using other data received in the CRL request message.

Thus, for example, the tailored CRL may only contain data about the vehicles or ITS endpoints that ITS endpoint 1110 is likely to encounter within a predetermined time period and therefore be smaller than the full CRL.

In other cases, if the ITS endpoint 1110 provides intended journey details to CRL provisioning proxy 1112, then the tailored CRL may be for the entire route and the vehicles or other ITS endpoints that ITS endpoint 1110 is likely to encounter for the route. As will be appreciated by those skilled in the art, this involves extrapolation of travel time and route choices to determine which vehicles or other ITS endpoints are likely to be encountered during that time period and on that route.

After the tailored CRL is determined, then the CRL provisioning proxy 1112 may send a message 1172 to the ITS endpoint 1110 containing the one or more tailored CRLs for ITS endpoint.

Message 1172 may further contain expiration data. Expiration data included by the CRL provisioning proxy in the CRL response message 1172 may depend on data that was received in the message 1120 and may be time limited. In this case, a time limit may be, but does not necessarily have to be, the same as the time limit contained in a full CRL. For example, such full CRL may contain a time limit in the nextUpdate field or in the nextCRL field.

The expiration time or time limit may be relative to the time that the ITS endpoint 1110 receives message 1172. Alternatively, the time may be an absolute time or date.

In other cases, the expiration data may include a geographical area limit. Again, such geographical area limit may be relative to the current position of the ITS endpoint 1110. Thus, if the ITS endpoint 1110 moves more than a threshold distance then a new tailored CRL may need to be requested. In other cases, the geographical area limit may be based on an absolute position.

In an alternative embodiment, an ITS endpoint may determine the tailored CRL when in a proxy environment. In this regard, reference is now made to FIG. 12.

Figure 12:
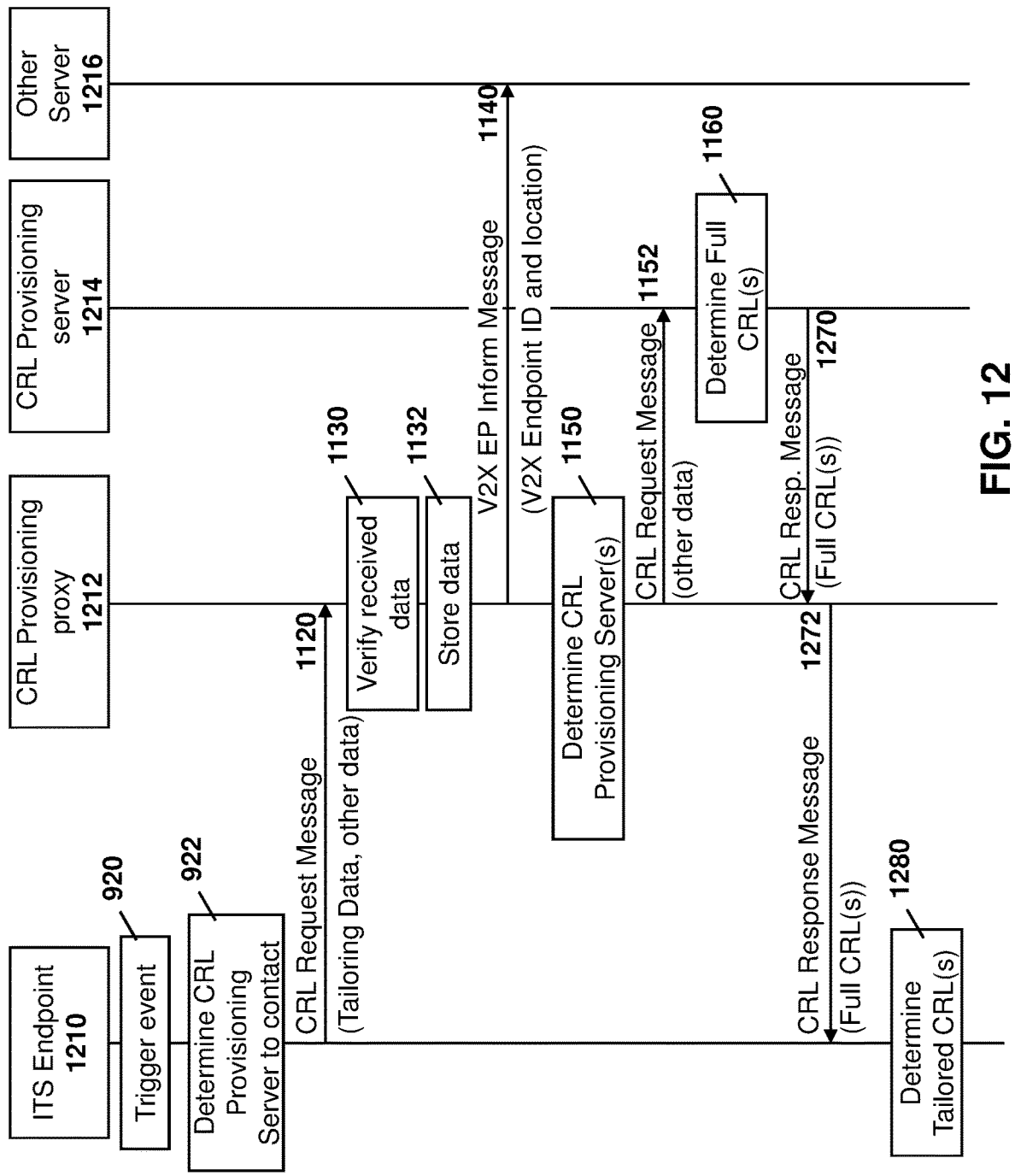
FIG. 12 is a dataflow diagram showing an ITS endpoint receiving one or more full CRLs from a CRL provisioning proxy and determining one or more tailored CRLs.

In the embodiment of FIG. 12, an ITS endpoint 1210 communicates with a CRL provisioning proxy 1212.

Further, the CRL provisioning proxy 1212 communicates with a provisioning server 1214.

Other server 1216 may be similar to other server 1116 from FIG. 11.

In the embodiment of FIG. 12, blocks 920, 922, 1130, 1132, 1150 and 1160, as well as messages 1120, 1140 and 1152 have similar functionality to that described above with regard to FIG. 11.

Once the full CRLs are determined at block 1160, CRL provisioning server 1214 may provide a message 1270 to CRL provisioning proxy 1212.

The CRL provisioning proxy 1212 receives message 1270 containing one or more full CRLs that contain location data for one or more entries within the one or more full CRLs.

In some cases, the CRL response message 1270 may be a delta containing only information that has changed since the last full CRL was sent to the CRL Provisioning Proxy 1212. This may be done to save bandwidth in the messaging with CRL Provisioning Proxy 1212.

If the one or more full CRLs do not contain location data for one or more entries, then the CRL provisioning proxy may add location data for the one or more entries within the one or more full CRLs.

The CRL provisioning proxy 1212 may then send a CRL response message 1272 to ITS endpoint 1210. Message 1272 contains one or more full CRLs that contain location data for the one or more entries within the one or more full CRLs.

In some cases, the CRL response message 1272 may be a delta containing only information that has changed since the last full CRL was sent to the ITS endpoint 1210. This may be done to save bandwidth in the messaging with ITS endpoint 1210.

The ITS endpoint 1210 receives the response message 1272 and may then determine a tailored CRL based on the location data for the one or more entries within the one or more full CRLs, as shown at block 1280. The tailored CRLs may be determined using tailoring data available to the ITS endpoint, the location data for one or more entries in the one or more full CRLs received, and may optionally also be determined using other data received in the CRL response message 1272.

In a further variation, the CRL response message 1272 may be sent to one or more ITS endpoints 1210 by the CRL provisioning proxy without the proxy first receiving a request message 1120. The request message 1120 may therefore be referred to as an ITS endpoint CRL report message and the CRL response message 1272 may be referred to as a CRL provisioning proxy report. The ITS endpoint 1210 may send tailoring data to enable the CRL provisioning proxy and/or CRL provisioning server to provide location data for the one or more entries within the one or more full CRLs included in the CRL provisioning proxy report. However, the CRL provisioning proxy and/or the CRL provisioning server may determine location data for the one or more entries within the one or more full CRLs included in the CRL provisioning proxy report using other methods. For example, the information may be obtained from road side unit information or obtained from public vehicles such as police cars, among other options.

Messaging

In the embodiments of FIGS. 9 to 12 above, various messaging could be used. In particular, the CRL request messages such as messages 930, 1120, and 1152 may use a Hypertext Transfer Protocol (HTTP)/HTTP Secure (HTTPS) method. For example, such method may include GET, HEAD, among other options.

Alternatively, such methods may use a Session Initiation Protocol (SIP) method including REGISTER, INVITE, MESSAGE, SUBSCRIBE, NOTIFY, among other options.

The CRL response message 960, 1062, 1162, 1172, 1270 and/or 1272 may use various messaging. For example, such messaging may include HTTP/HTTPS response such as 200 OK.

In other embodiments, the messaging may use a SIP response such as 200 OK.

In other embodiments the responses may use an HTTP/HTTPS method such as GET, HEAD, among others.

In other embodiments, the response messages may include a SIP method such as INVITE, MESSAGE, SUBSCRIBE, NOTIFY, among others.

The above messaging may be secured using additional security-related mechanisms such as Secure Sockets Layer (SSL), Transport Layer Security (TLS), Internet Protocol Security (IPsec), Internet Key Exchange (IKE), among others.

Furthermore, in the messaging described in FIGS. 9 to 12, an identity or identifier for an ITS endpoint could be any identifier that uniquely identifies the ITS endpoint. For example, the endpoint identity could be one or more of the following:

One or more certificates or fields of certificates (e.g. linkage Id, linkage seeds, HashId8, etc) associated with the ITS endpoint;

One or more International Mobile Subscriber Identities (IMSIs), Temporary Mobile Subscriber Identities (TMSIs), Packet TMSIs (P-TMSIs), Globally Unique Temporary UE Identities (GUTIs), Fifth Generation GUTIs (5G-GUTIs);

One or more equipment identities e.g. IMEIs;

One or more Mobile Station International Subscriber Directory Numbers (MSISDNs);

One or more IP addresses or portions of IP addresses;

One or more Medium Access Control (MAC) addresses;

One or more SIP Universal Resource Identifiers (URIs); or

One or more Tel URIs.

As will be appreciated by those skilled in the art, some of the above identities or identifiers are subject to change and therefore may provide only a temporary identity or identifier of the ITS endpoint. Such temporary identity or identifier may still be beneficial in that it may enhance the privacy of the ITS endpoint by preventing long-term tracking of the ITS endpoint.

Tailoring Data

Further, from the embodiments of FIGS. 9 to 12 above, the ITS endpoint may send tailoring data to the CRL proxy or CRL server in order to obtain a tailored CRL. The tailoring data is sent by an ITS endpoint and may consist of one or a combination of the following:

- the requesting ITS endpoint's Location Information;
- the requesting ITS endpoint's Intended Journey Details;
- one or more ITS endpoint identities/identifiers issued/ belonging to the CRL requesting ITS endpoint; or
- one or more certificates and/or one or more fields of one or more certificates (e.g. an identifier field (e.g. id, CertificateID, etc.) a public key field (e.g. encryptionKey, PublicEncryptionKey, verifyKeyIndicator, etc.), etc.) that the requesting ITS endpoint has received from other ITS endpoints within a certain time period.

Tailored CRL

The tailored CRL consists of a subset of CRL entries of one or more full CRLs, as well as an expiry time and an expiry location.

The expiry time field may, but does not necessarily, contain the same value as the equivalent field from the full CRL such as the nextUpdate field and the nextCRL field.

The expiry location may consist of one or more of the following:

- A set of co-ordinates and/or set of distances (e.g. a radius, a diameter, a length, etc.) identifying a geographical shape e.g. rectangle, polygon, circle, etc.
- A list of one or more PLMN identities
- A list of one or more PLMN area identities (e.g. RAI, TAI, etc)

Examples of changes to various standards for Tailored CRLs are shown in Tables 2 and 3 below.

For example, Table 2 shows a change to the IEEE 1609.2, "IEEE Standard for Wireless Access in Vehicular Environments—Security Services for Applications and Management Messages", 2016 specification, in which changes to the specification are shown in bold.

TABLE 2

Example changes to IEEE 1609.2

7.3 Data structures
7.3.1 General
Subclause 7.3 specifies the CRL contents using ASN.1. Subclause B.2
provides the complete ASN.1 module for CRLs. In the case of a conflict, 7.3 takes
precedence.
For linkage ID-based CRLs, the CRL encodes the information fields specified
in 5.1.3.4. Rather than listing the information fields individually for each entry,
the fields are nested to provide a more compact encoding with those fields
that are anticipated to have the fewest distinct values provided on the outer
layers of the nesting. In particular, the CRL design anticipates that CAs
organize certificate issuance such that all certificates that are potentially on
the same CRL (i.e., with the same crlSeries and cracaId values) use the same
iCert value at the same time.
7.3.2 CrlContents
CrlContents ::= SEQUENCE {
    version Uint8 (1),
    crlSeries CrlSeries,
    cracaId HashedId8,
    issueDate Time32,
    nextCrl SEQUENCE {
        nextCrlTime__Time32,
        nextCrlLocation GeographicRegion OPTIONAL,
        ...
    }
    priorityInfo CrlPriorityInfo,
    typeSpecific CHOICE {
        fullHashCrl ToBeSignedHashIdCrl,
        deltaHashCrl ToBeSignedHashIdCrl,
        fullLinkedCrl ToBeSignedLinkageValueCrl,
        deltaLinkedCrl ToBeSignedLinkageValueCrl,
        ...
    }
}
The fields in this structure have the following meaning:
- version is the version number of the CRL. For this version of this standard it is 1.
- crlSeries represents the CRL series to which this CRL belongs. This is used to determine whether the revocation information in a CRL is relevant to a particular certificate as specified in 5.1.3.2.
- cracaId contains the low-order eight octets of the hash of the certificate of the Certificate Revocation Authorization CA (CRACA) that ultimately authorized the issuance of this CRL. This is used to determine whether the revocation information in a CRL is relevant to a particular certificate as specified in 5.1.3.2. In a valid signed CRL as specified in 7.4 the cracaId is consistent with the associatedCraca field in the Service Specific Permissions as defined in 7.4.3.3.
- issueDate specifies the time when the CRL was issued.
- nextCrl contains the time and optionally the location when the next CRL with the same crlSeries and cracaId is expected to be issued. The CRL is invalid unless nextCrl is strictly after issueDate. This field is used to set the expected update time/location for revocation information associated with the (cracaId, crlSeries) pair as specified in 5.1.3.6.
- priorityInfo contains information that assists devices with limited storage space in determining which revocation information to retain and which to discard.

TABLE 2-continued

Example changes to IEEE 1609.2

- typeSpecific contains the CRL body:
    o  fullHashCrl contains a full hash-based CRL, i.e., a listing of the hashes of all certificates that:
        ▪ contain the indicated cracaId and crlSeries values, and
        ▪ are revoked by hash, and
        ▪ have been revoked, and
        ▪ have not expired.
    o  deltaHashCrl contains a delta hash-based CRL, i.e., a listing of the hashes of all certificates that:
        ▪ contain the specified cracaId and crlSeries values, and
        ▪ are revoked by hash, and
        ▪ have been revoked since the previous CRL that contained the indicated cracaId and crlSeries values.
    o  fullLinkedCrl contains a full linkage ID-based CRL, i.e., a listing of the individual and/or group linkage data for all certificates that:
        ▪ contain the indicated cracaId and crlSeries values, and
        ▪ are revoked by linkage data, and
        ▪ have been revoked, and
        ▪ have not expired.
    o  deltaLinkedCrl contains a delta linkage ID-based CRL, i.e., a listing of the individual and/or group linkage data for all certificates that:
        ▪ contain the specified cracaId and crlSeries values, and
        ▪ are revoked by linkage data, and
        ▪ have been revoked since the previous CRL that contained the indicated cracaId and crlSeries values.

Table 3 shows example changes to the ETSI TS 102 941, *"Intelligent Transport Systems (ITS); Security; Trust and Privacy Management"*, v.1.2.1, May 2018, where the changes are shown in bold.

TABLE 3

Example changes to ETSI TS 102 941

A.2.7   Trust lists data types
EtsiTs102941TrustLists
{ itu-t(0) identified-organization(4) etsi(0) itsDomain(5) wg5(5) ts(102941) trustLists(6) version1(1)}
DEFINITIONS AUTOMATIC TAGS ::=
BEGIN
IMPORTS
EtsiTs103097Certificate, EtsiTs103097Data-SignedAndEncrypted,
EtsiTs103097Data-Signed
FROM
EtsiTs103097Module
{itu-t(0) identified-organization(4) etsi(0) itsDomain(5) wg5(5) ts(103097) securedMessageV1(0)}
HashedId8, Time32, Version --, CertificateAuthorityConstraints
FROM EtsiTs102941BaseTypes
{itu-t(0) identified-organization(4) etsi(0) itsDomain(5) wg5(5) ts(102941) baseTypes(3) version1(1)}
;
/************
-- CRL
*************/
ToBeSignedCrl ::= SEQUENCE {
  version   _Version,
  thisUpdate _Time32,
  nextUpdateTime   Time32,
  _nextUpdateLocation GeographicRegion,
  entries SEQUENCE OF CrlEntry,
  ...
}
CrlEntry ::= HashedId8

In Table 3 above, the geographic region data type used is the data type imported from and defined in section 6.4.17 of the IEEE 802.16, *"IEEE Standard for Air Interface for Broadband Wireless Access Systems"*, 2017 specification.

When receiving messaging from ITS endpoints, the CRL provisioning server and/or CRL provisioning proxy use the received and/or determined location information of the CRL requesting ITS endpoint, and if provided, the received intended journey details, to determine the contents of the tailored CRL or CRLs to include in the response to the ITS endpoint. That is, the CRL provisioning server or proxy includes data of other ITS endpoints in the tailored CRL where the other ITS endpoints are one or more of the following:

Within a certain proximity of/distance from the requesting vehicle.

Determined to be within a certain proximity of/distance from the requesting vehicle within a certain time period e.g. the time period of when requesting vehicle is expected by the CRL Provisioning Server to request to obtain a further CRL/set of CRLs.

Whose location is unknown.

In the above, determined data may include data obtained by contacting one or more location services servers such as a 3GPP compliant location server, an Open Mobile Alliance (OMA) compliant location server, among others, to obtain location information of the ITS endpoint and, if provided, the received intended journey details.

Verification and Assurance of Data

In order to provide assurance of the location of the CRL requesting ITS endpoint, the CRL provisioning server or proxy may contact another server such as a location services server, another entity within the cellular network such as the Home Location Register (HLR), Home Subscriber Server (HSS), Application Programming Interface (API) endpoint, Gateway Mobile Location Center (GMLC), among others, and/or by inference by the CRL provisioning server or proxy due to the CRL provisioning server or proxy's geographic location to verify such location data. For example, the geographical location may be used in deployments where different instances of CRL provisioning servers are deployed in different locations such as that described in FIG. 8 above.

In cases where an ITS endpoint identity is received by another ITS endpoint and is forwarded to the provisioning server or proxy, in order to provide more assurance for such identity, the ITS endpoint requesting the CRL may be required to provide an identity in the tailoring data message. Further, the CRL provisioning server or proxy may withhold updating the location of an ITS endpoint associated with the identity or identifier received from another ITS endpoint until a number of reports of that ITS endpoint identity from a certain location exceeds a threshold. In other words, a ITS endpoint identity may be verified if reported by a threshold number of other ITS endpoints.

The threshold can be any whole number and are typically between zero and any arbitrary number such as 10, 100, 65535, among others. The value of the location data can be a numeric value that identifies a location.

Alternative Embodiments

In some cases, instead of requesting and receiving a tailored CRL, the ITS endpoint could request and receive a list of certificates known to not be revoked. In other words, rather than a certificate revocation list, a "white" list could be received indicating certificates that are still valid. Such white list may be tailored in a manner similar to the above embodiments for the CRL. In other words, the ITS endpoint may request a whitelist with tailoring information, and then received a tailored whitelist.

In other cases, the ITS endpoint may receive a full white list and create a tailored whitelist in a manner similar to the embodiments of FIGS. 10 and 12 above.

In a further alternative embodiment, in order to increase privacy of the location of ITS endpoints, CRLs could be split into different geographical zones or areas, and the CRL requesting ITS endpoint is provided with, or configured with, information of the different geographical zones or areas of the CRLs. The CRL requesting ITS endpoint can request one or more CRLs for the one or more geographical locations that the CRL requesting ITS endpoint is currently within a certain proximity of and/or the one or more geographical zones that it will be within a certain proximity based on the intended journey details.

The CRL requesting ITS endpoint includes its current geographical zone or area in which it currently is located within a request, such as within the tailoring data.

The geographical size of the geographical zone may be larger in certain areas than others. For example, the geographical zone may be larger where the V2X service related data connection coverage is known to be sparse due to a lack of base stations, lack of roadside units, among other factors. In other cases, the geographical zone may be smaller where data coverage is known to be less sparse or more proliferate.

In a further alternative embodiment, an ITS endpoint may receive an indication from a CRL provisioning proxy or CRL provisioning server that the ITS endpoint should perform an action as an alternative to, or in addition to, checking a CRL. For example, such action may be to perform an OCSP lookup procedure on one or more of the received certificates. This may be used, for example, in the case where data coverage is good and an OCSP lookup has a high chance of being successful, can be done quickly, and so on.

In other cases, an ITS endpoint may be instructed to use OCSP staples for its messaging to alleviate the burden on other ITS endpoints for doing CRL checking.

As will be appreciated, utilizing OCSP staples allows for less storage to be used on the ITS endpoint and may be beneficial, especially when a tailored CRL becomes too large for the ITS endpoint.

Other alternatives utilizing the techniques above could also be used.

The ITS endpoints, ITS stations and network elements described above may be any computing device or network node. Such computing device or network node may include any type of electronic device, including but not limited to, mobile devices such as smartphones or cellular telephones. Examples can further include fixed or mobile user equipment, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, engine control units (ECUs), among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 13:
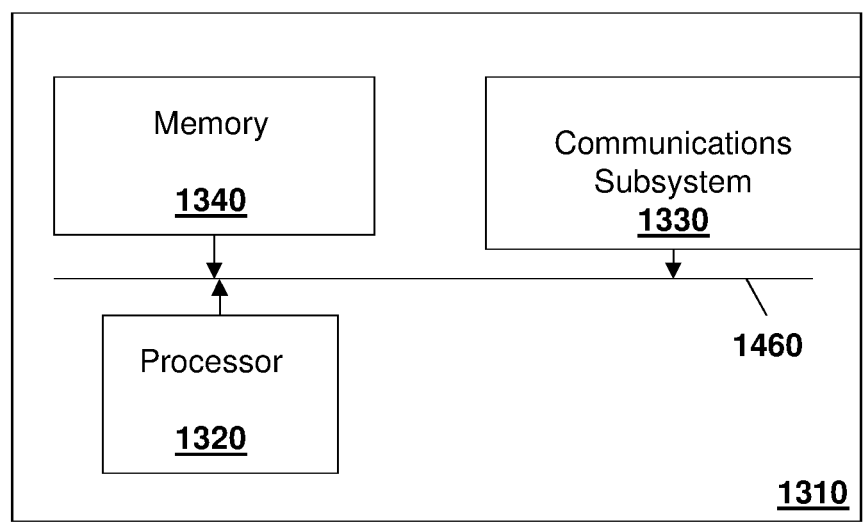
FIG. 13 is a block diagram of a simplified computing device capable of being used with the embodiments of the present disclosure.

One simplified diagram of a computing device is shown with regard to FIG. 13. The computing device of FIG. 13 could be any mobile device, portable device, network node, ITS station, server, or other node as described above.

In FIG. 13, device 1310 includes a processor 1320 and a communications subsystem 1330, where the processor 1320 and communications subsystem 1330 cooperate to perform the methods of the embodiments described above. Communications subsystem 1320 may, in some embodiments, comprise multiple subsystems, for example for different radio technologies.

Processor 1320 is configured to execute programmable logic, which may be stored, along with data, on device 1310, and shown in the example of FIG. 13 as memory 1340. Memory 1340 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1340, device 1310 may access data or programmable logic from an external storage medium, for example through communications subsystem 1330.

Communications subsystem 1330 allows device 1310 to communicate with other devices or network elements and may vary based on the type of communication being performed. Further, communications subsystem 1330 may comprise a plurality of communications technologies, including any wired or wireless communications technology.

Communications between the various elements of device 1310 may be through an internal bus 1360 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device within a vehicle Intelligent Transportation System (ITS), the method comprising:
    receiving a first message, the first message including at least tailoring information for a first ITS endpoint and intended journey details for the first ITS endpoint, the intended journey details comprising at least one time stamp, each time stamp of the at least one time stamp being associated with a geographic location, where the tailoring information comprises one or more of: location information for the first ITS endpoint; one or more ITS endpoint identifiers belonging to the first ITS endpoint; or one or more certificates or identities of ITS endpoints that have communicated with the first ITS endpoint within a threshold time period;
    storing all or a subset of data from the first message;
    obtaining a full certificate revocation list;
    creating a tailored certificate revocation list based on data in the first message and the full certificate revocation list, the tailored certificate revocation list containing certificates or identifiers of certificates for ITS endpoints that may be encountered by the first ITS endpoint when navigating a route provided in the intended journey details; and
    providing the tailored certificate revocation list to the first ITS endpoint.

2. The method of claim 1, wherein the computing device is a certificate revocation list provisioning server, and wherein the obtaining comprises determining the full certificate revocation list at the computing device.

3. The method of claim 1, wherein the computing device is a certificate revocation list provisioning proxy, and wherein the obtaining comprises requesting a certificate revocation list from a certificate revocation list provisioning server and receiving the full certificate revocation list at the computing device from the certificate revocation list provisioning server.

4. The method of claim 1, further comprising, after receiving the first message, obtaining location information for the first ITS endpoint.

5. The method of claim 1, wherein the receiving uses any one of a hypertext transfer protocol; hypertext transfer protocol secure; or a Session Initiation Protocol message.

6. The method of claim 1, wherein the ITS endpoint identifier includes one or more of: certificates or fields of certificates associated with the first ITS endpoint; International Mobile Subscriber Identities, Temporary Mobile Subscriber Identities, Packet-Temporary Mobile Subscriber Identities, Globally Unique Temporary User Equipment Identities, or Fifth Generation Globally Unique Temporary User Equipment Identities; equipment identities; Mobile Station International Subscriber Directory Numbers; Internet Protocol addresses or portions of Internet Protocol addresses; Medium Access Control addresses; Session Initiation Protocol Universal Resource Identifiers; or Telephone Universal Resource Identifiers.

7. The method of claim 1, further comprising, prior to the providing the tailored certificate revocation list, adding expiration information to the tailored certificate revocation list.

8. The method of claim 7, wherein the expiration information is an absolute or relative time that the tailored certificate revocation list will expire.

9. The method of claim 7, wherein the expiration information is an absolute or relative geographic boundary, which, when crossed by the first ITS endpoint, causes the tailored certificate revocation list to expire.

10. The method of claim 1, further comprising verifying all or a subset of data from the first message prior to the storing.

11. A computing device within a vehicle Intelligent Transportation System (ITS), the computing device comprising:
   a processor; and
   a communications subsystem,
   wherein the computing device is configured to:
   receive a first message, the first message including at least tailoring information for a first ITS endpoint and intended journey details for the first ITS endpoint, the intended journey details comprising at least one time stamp, each time stamp of the at least one time stamp being associated with a geographic location, where the tailoring information comprises one or more of: location information for the first ITS endpoint; one or more ITS endpoint identifiers belonging to the first ITS endpoint; or one or more certificates or identities of ITS endpoints that have communicated with the first ITS endpoint within a threshold time period;
   store all or a subset of data from the first message;
   obtain a full certificate revocation list;
   create a tailored certificate revocation list based on data in the first message and the full certificate revocation list, the tailored certificate revocation list containing certificates or identifiers of certificates for ITS endpoints that may be encountered by the first ITS endpoint when navigating a route provided in the intended journey details; and
   provide the tailored certificate revocation list to the first ITS endpoint.

12. The computing device of claim 11, wherein the computing device is a certificate revocation list provisioning server, and wherein the computing device is configured to obtain by determining the full certificate revocation list at the computing device.

13. The computing device of claim 11, wherein the computing device is a certificate revocation list provisioning proxy, and wherein the computing device is configured to obtain by requesting a certificate revocation list from a certificate revocation list provisioning server and receive the full certificate revocation list at the computing device from the certificate revocation list provisioning server.

14. The computing device of claim 11, wherein the computing device is further configured to, after receiving the first message, obtain location information for the first ITS endpoint.

15. The computing device of claim 11, wherein the computing device is configured to receive using any one of a hypertext transfer protocol; hypertext transfer protocol secure; or a Session Initiation Protocol message.

16. The computing device of claim 11, wherein the ITS endpoint identifier includes one or more of: certificates or fields of certificates associated with the first ITS endpoint; International Mobile Subscriber Identities, Temporary Mobile Subscriber Identities, Packet-Temporary Mobile Subscriber Identities, Globally Unique Temporary User Equipment Identities, or Fifth Generation Globally Unique Temporary User Equipment Identities; equipment identities; Mobile Station International Subscriber Directory Numbers; Internet Protocol addresses or portions of Internet Protocol addresses; Medium Access Control addresses; Session Initiation Protocol Universal Resource Identifiers; or Telephone Universal Resource Identifiers.

17. The computing device of claim 11, wherein the computing device is further configured to, prior to the providing the tailored certificate revocation list, add expiration information to the tailored certificate revocation list.

18. The computing device of claim 17, wherein the expiration information is an absolute or relative time that the tailored certificate revocation list will expire.

19. The computing device of claim 17, wherein the expiration information is an absolute or relative geographic boundary, which, when crossed by the first ITS endpoint, causes the tailored certificate revocation list to expire.

20. The computing device of claim 11, wherein the computing device is further configured to verify all or a subset of data from the first message prior to storing the data.

21. A non-transitory computer readable medium for storing instruction code, which, when executed by a processor of a computing device within a vehicle Intelligent Transportation System (ITS) cause the computing device to:
   receive a first message, the first message including at least tailoring information for a first ITS endpoint and intended journey details for the first ITS endpoint, the intended journey details comprising at least one time stamp, each time stamp of the at least one time stamp being associated with a geographic location, where the tailoring information comprises one or more of: location information for the first ITS endpoint; one or more ITS endpoint identifiers belonging to the first ITS endpoint; or one or more certificates or identities of ITS endpoints that have communicated with the first ITS endpoint within a threshold time period;
   store all or a subset of data from the first message;
   obtain a full certificate revocation list;
   create a tailored certificate revocation list based on data in the first message and the full certificate revocation list, the tailored certificate revocation list containing certificates or identifiers of certificates for ITS endpoints that may be encountered by the first ITS endpoint when navigating a route provided in the intended journey details; and
   provide the tailored certificate revocation list to the first ITS endpoint.

* * * * *